(12) United States Patent
Yoshikawa

(10) Patent No.: US 9,979,881 B2
(45) Date of Patent: May 22, 2018

(54) IMAGING CONTROL APPARATUS AND METHOD FOR CONTROLLING THE SAME

(71) Applicant: CANON KABUSHIKI KAISHA, Tokyo (JP)

(72) Inventor: Akio Yoshikawa, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 6 days.

(21) Appl. No.: 15/360,338

(22) Filed: Nov. 23, 2016

(65) Prior Publication Data
US 2017/0155825 A1   Jun. 1, 2017

(30) Foreign Application Priority Data

Nov. 30, 2015   (JP) ................................. 2015-234301

(51) Int. Cl.
*H04N 5/77*   (2006.01)
*H04N 9/804*   (2006.01)
*H04N 5/232*   (2006.01)

(52) U.S. Cl.
CPC ..... *H04N 5/23216* (2013.01); *H04N 5/23206* (2013.01); *H04N 5/23212* (2013.01); *H04N 5/23293* (2013.01); *H04N 5/77* (2013.01); *H04N 5/772* (2013.01); *H04N 9/8042* (2013.01)

(58) Field of Classification Search
CPC ............... H04N 5/23216; H04N 5/772; H04N 5/23293; H04N 5/77; H04N 5/23212; H04N 5/23206; H04N 9/8042
See application file for complete search history.

(56) References Cited

U.S. PATENT DOCUMENTS

| 2012/0146929 | A1* | 6/2012 | Oyama | G06F 3/0416 345/173 |
| 2013/0063645 | A1* | 3/2013 | Aoyama | H04N 5/23293 348/333.01 |
| 2016/0224179 | A1* | 8/2016 | Ichihara | G06F 3/0416 |
| 2017/0155826 | A1* | 6/2017 | Nakagawa | H04N 5/23212 |
| 2017/0195552 | A1* | 7/2017 | Saito | H04N 5/23216 |
| 2017/0195553 | A1* | 7/2017 | Shiozaki | G06F 3/0488 |

FOREIGN PATENT DOCUMENTS

JP   2012-203143 A   10/2012

* cited by examiner

*Primary Examiner* — Shahbaz Nazrul
(74) *Attorney, Agent, or Firm* — Canon U.S.A., Inc. IP Division

(57) ABSTRACT

An imaging control apparatus includes a touch detection unit that detects a touch operation on a touch panel, a display control unit that performs control, in response to a touch position moving operation, to display a first mark at a position, on a display unit, moved by an amount corresponding to the moving operation, and a control unit that performs control, during recording of a captured moving image, not to perform specific processing relating to image capturing during at least a predetermined time period even if a touch-up operation, which is releasing the touch performed following the moving operation, and perform control, in a predetermined state other than during recording of a captured moving image, to perform within the predetermined time period the specific processing based on a position of the touch-up operation, in response to a touch-up operation performed following the moving operation.

28 Claims, 13 Drawing Sheets

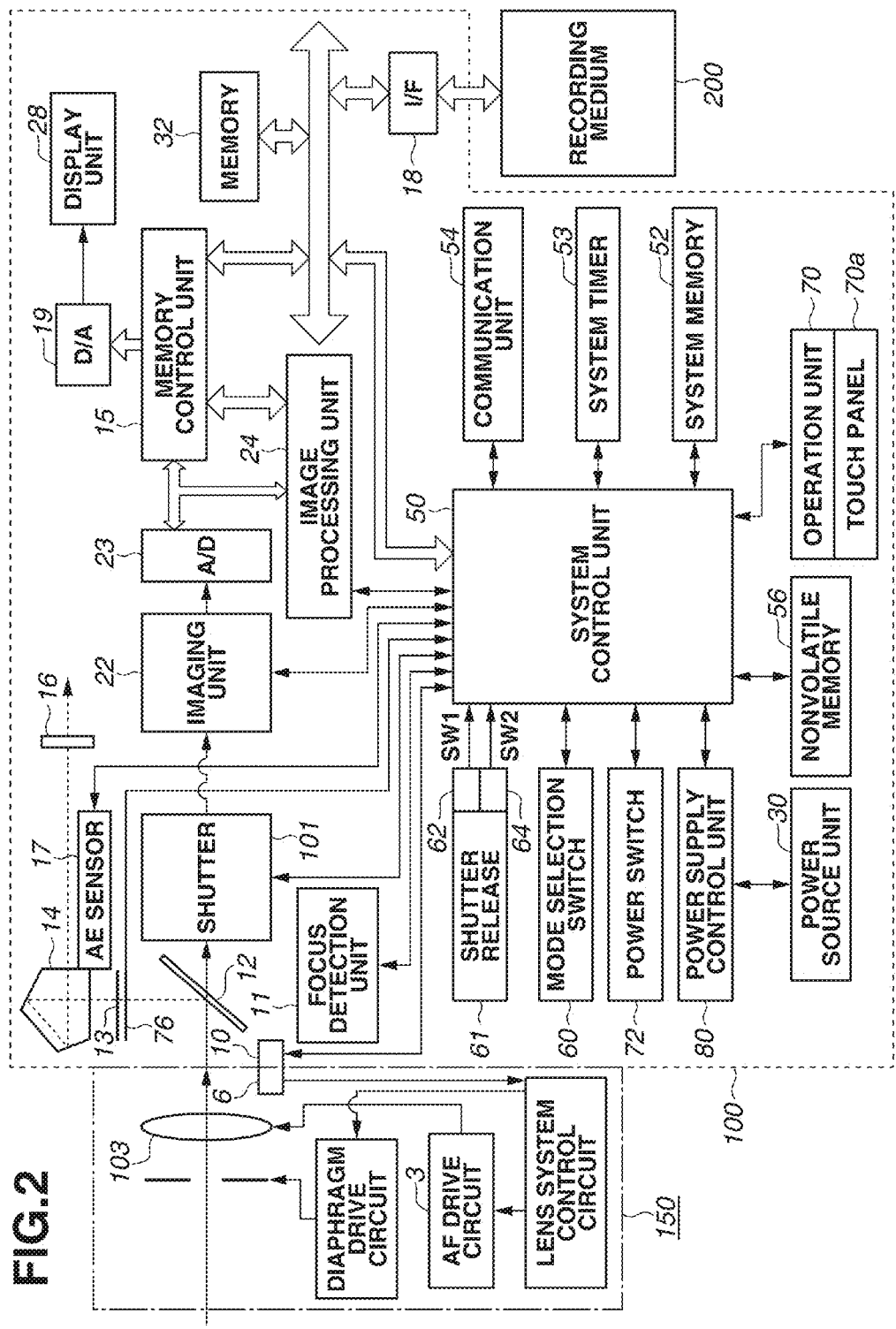

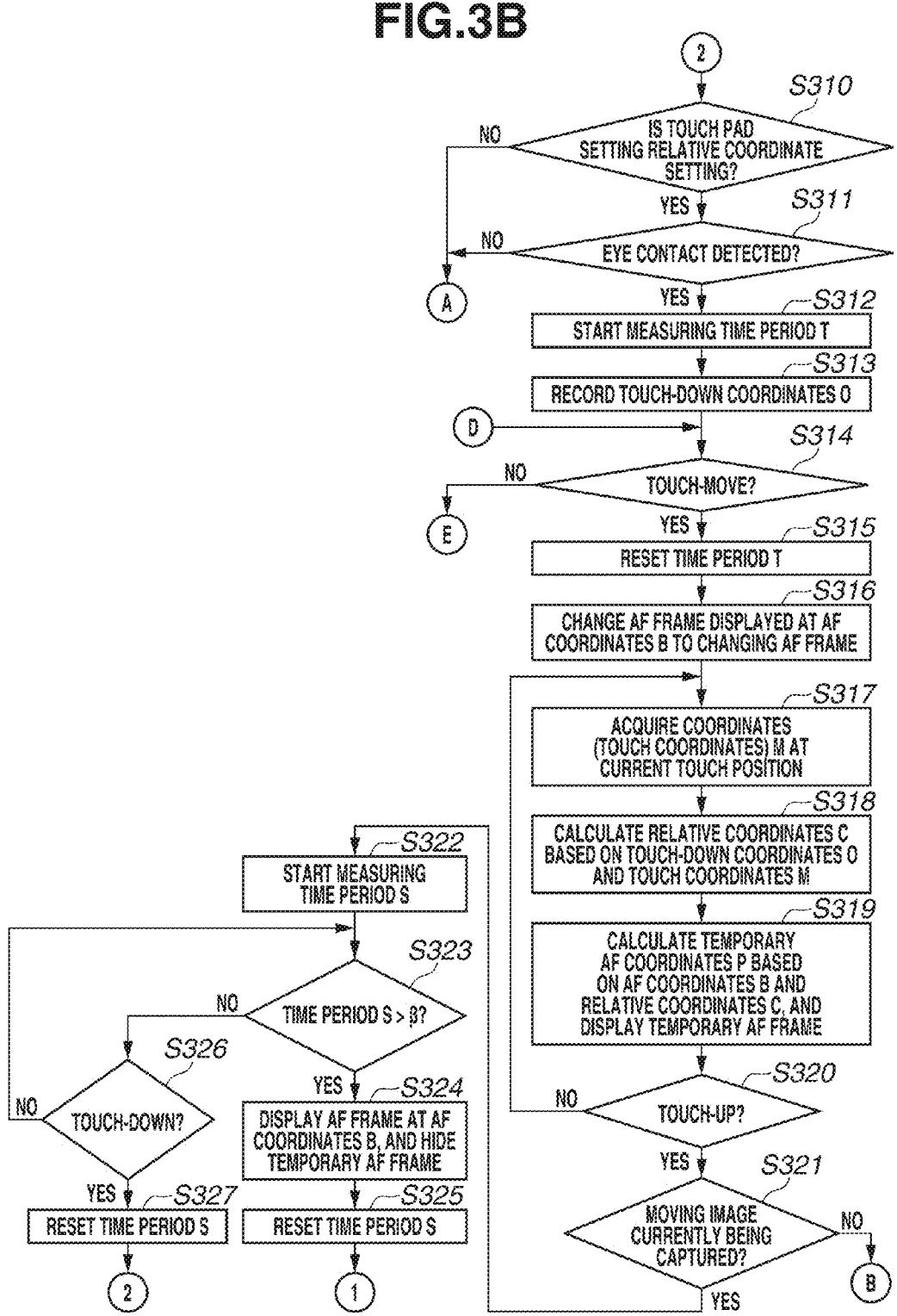

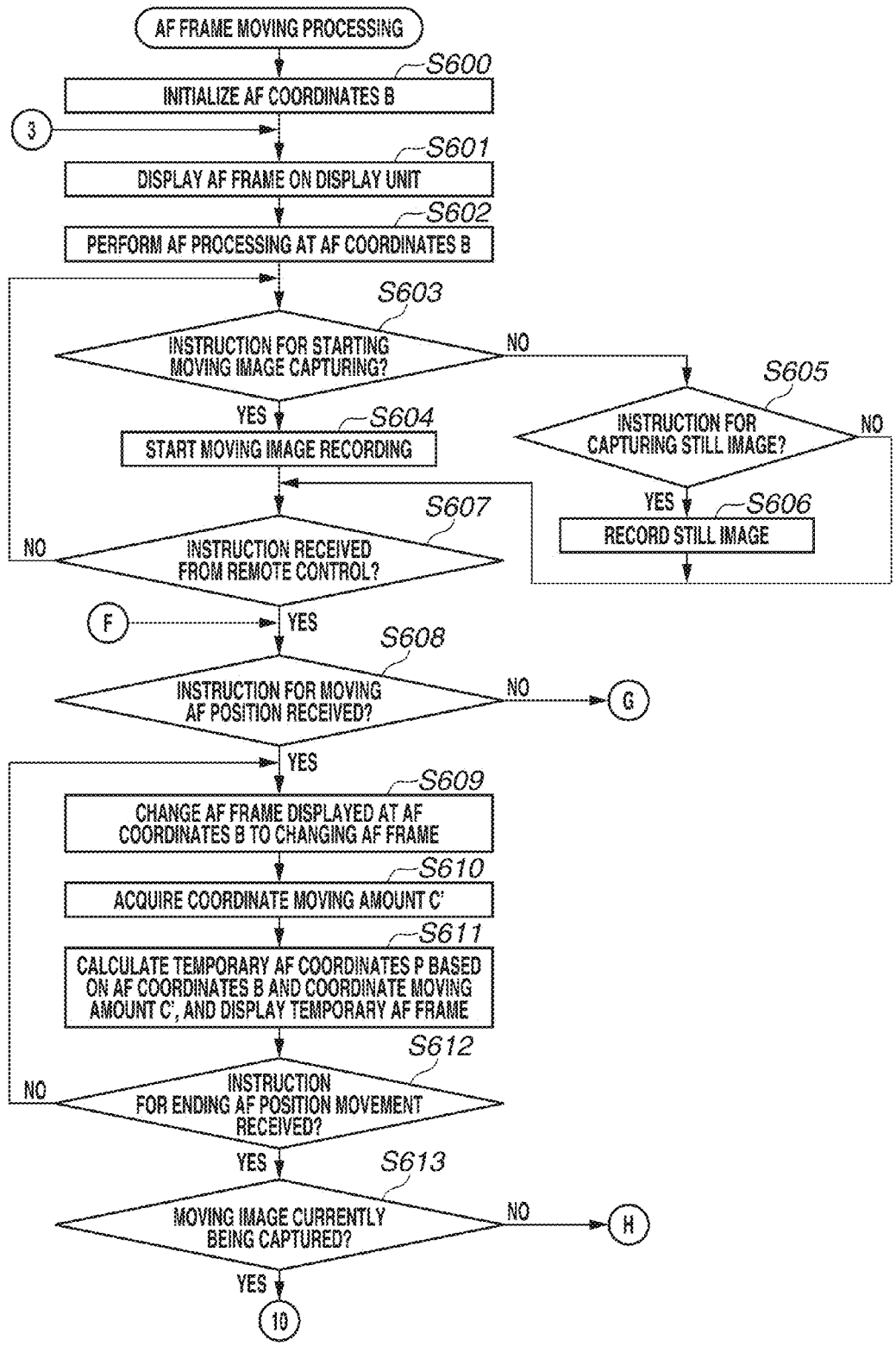

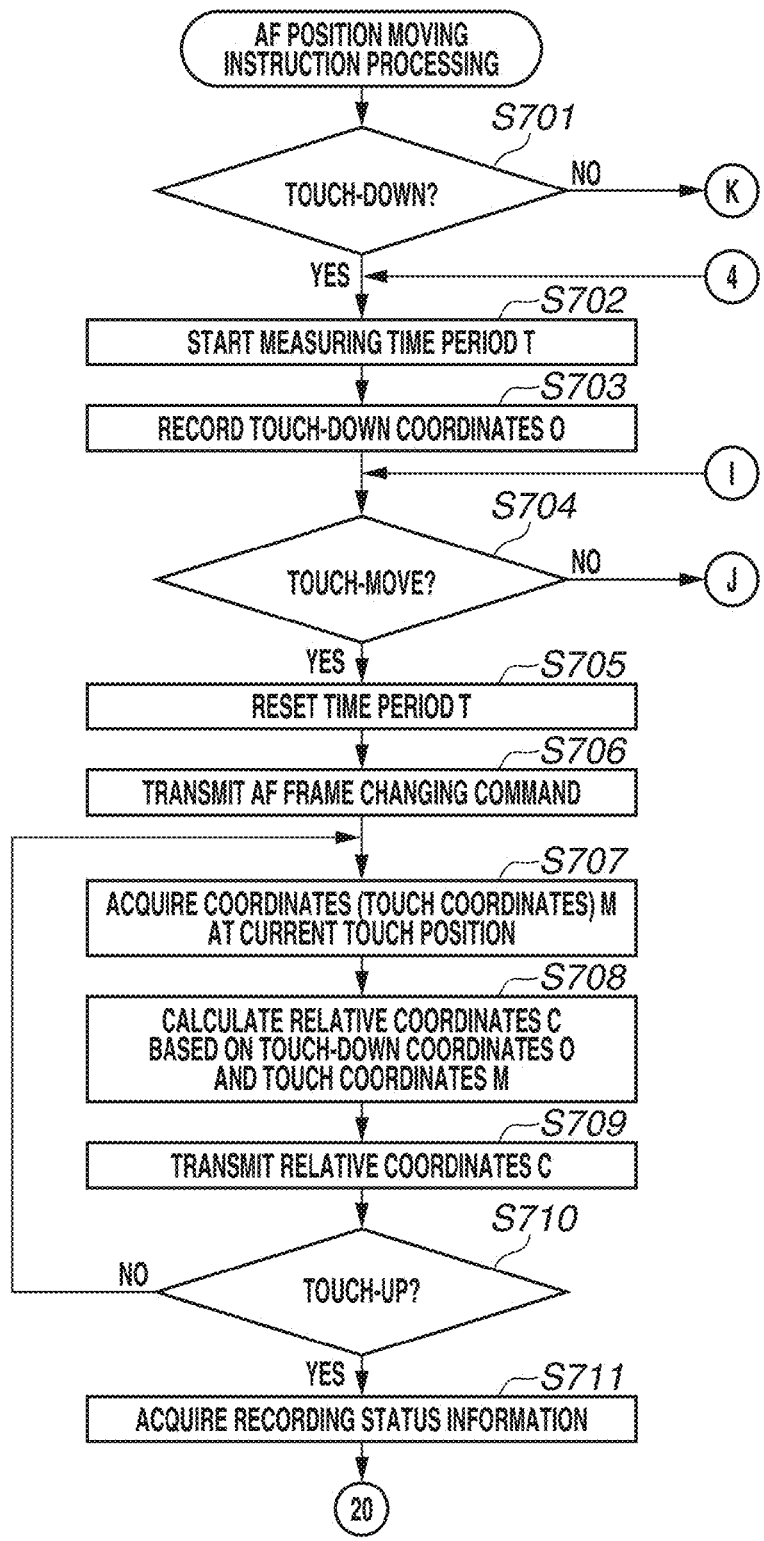

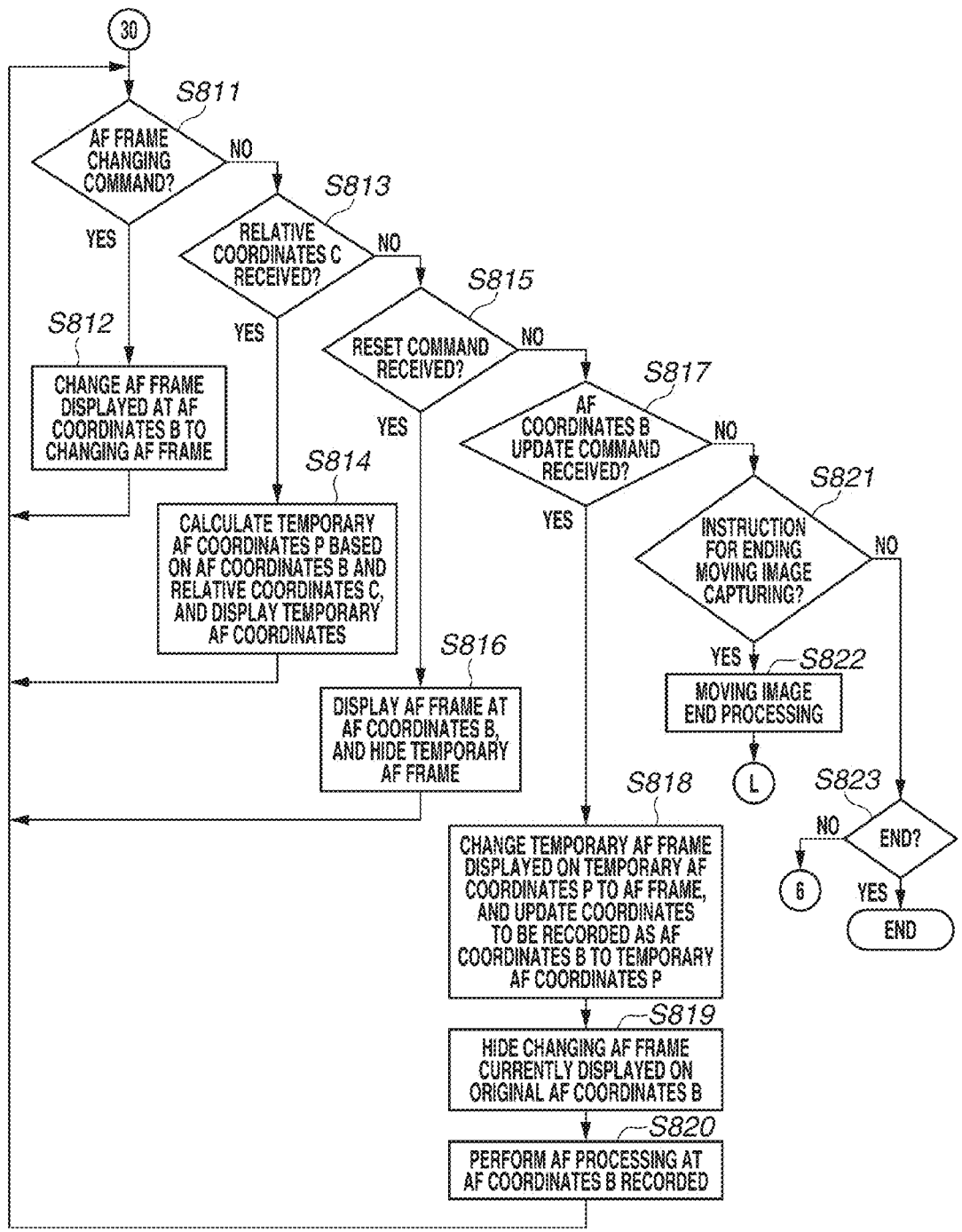

IMAGING CONTROL APPARATUS AND METHOD FOR CONTROLLING THE SAME

BACKGROUND

Field

The present disclosure relates to an imaging control apparatus and a method for controlling the image control apparatus, and particularly to a technique for setting a position where specific processing relating to image capturing is performed.

Description of the Related Art

In recent years, there has been proposed a method in which a user specifies an automatic focusing (AF) position by operating a touch panel provided on the back side of an imaging apparatus while looking into an in-finder display unit. Japanese Patent Application Laid-Open No. 2012-203143 discusses a technique in which a user moves an AF target frame by performing a touch operation on a touch panel while looking into an in-finder display unit, and determining the display position of the AF target frame as an AF position through a double-tap.

AF processing, automatic exposure (AE) processing, white balance (WB) processing, and the like are performed in both still image capturing and moving image capturing. For example, the AF processing is performed as follows. In still image capturing, the user specifies the AF position before capturing an image. In moving image capturing, the user can specify an AF position before starting recording a moving image, and can change the AF position in the middle of moving image recording. If the method discussed in Japanese Patent Application Laid-Open No. 2012-203143 is applied to still image capturing, the user needs to perform a double-tap operation, after moving the AF target frame, to specify the AF position. Therefore, the user may possibly miss image capturing opportunities. To solve such a problem, the user can move the AF position to the frame position according to the movement of the AF target frame. In this case, however, an image automatically focused at a position other than a desired position may be recorded at the time of moving image recording.

SUMMARY

The present disclosure is directed to an imaging control apparatus that improves operability for setting a specified position relating to specific processing performed based on a specified position during moving image recording and at timings other than moving image recording.

According to aspects of embodiments, an imaging control apparatus includes a touch detection unit configured to detect a touch operation on a touch panel, a display control unit configured to control, in response to the touch detection unit detecting a moving operation of moving a touch position, a first mark to be displayed at a position on a display unit moved by an amount corresponding to the moving operation, and a control unit configured to perform control, during recording of a captured moving image, not to perform specific processing relating to image capturing during at least a predetermined time period even if the touch detection unit detects a touch-up operation which is releasing of the touch performed following the moving operation, and perform control, in a predetermined state other than during recording of a captured moving image, to perform within the predetermined time period the specific processing based on a position where the touch-up operation is detected, in response to the touch detection unit detecting a touch-up operation performed following the moving operation.

Further features will become apparent from the following description of exemplary embodiments with reference to the attached drawings.

BRIEF DESCRIPTION OF THE DRAWINGS

FIG. 2 is a block diagram illustrating an example of a configuration of the digital camera as an example of the apparatus to which the configuration of the first exemplary embodiment is applicable.

FIGS. 3A, 3B, and 3C are flowcharts illustrating automatic focusing (AF) moving processing according to the first exemplary embodiment.

FIGS. 6A and 6B are flowcharts illustrating AF moving processing according to the second exemplary embodiment.

FIGS. 7A and 7B are flowcharts illustrating AF position moving instruction processing of a remote control according to a modification of the second exemplary embodiment.

FIGS. 8A and 8B are flowcharts illustrating AF position movement reception processing of a digital camera according to the modification of the second exemplary embodiment.

DESCRIPTION OF THE EMBODIMENTS

Exemplary embodiments will be described in detail below with reference to the accompanying drawings.

It is to be noted that the following exemplary embodiment is merely an example and can be appropriately modified or changed. Thus, the following exemplary embodiment is not seen to be limiting.

A first exemplary embodiment will be described below with reference to the accompanying drawings.

Figure 1A:
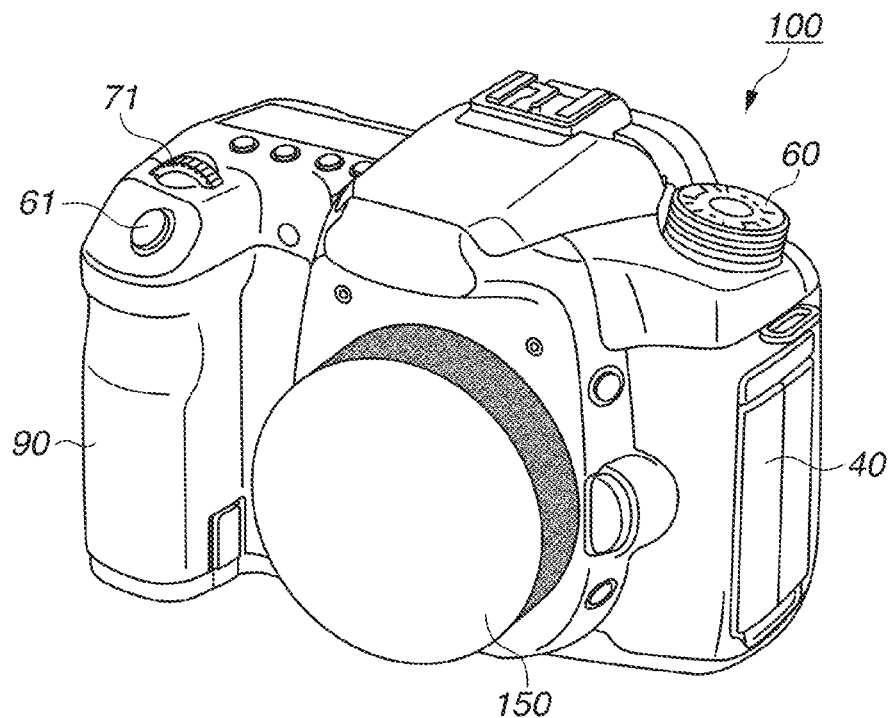
FIGS. 1A and 1B are external views illustrating a digital camera as an example of an apparatus to which a configuration of a first exemplary embodiment is applicable.
Figure 1B:
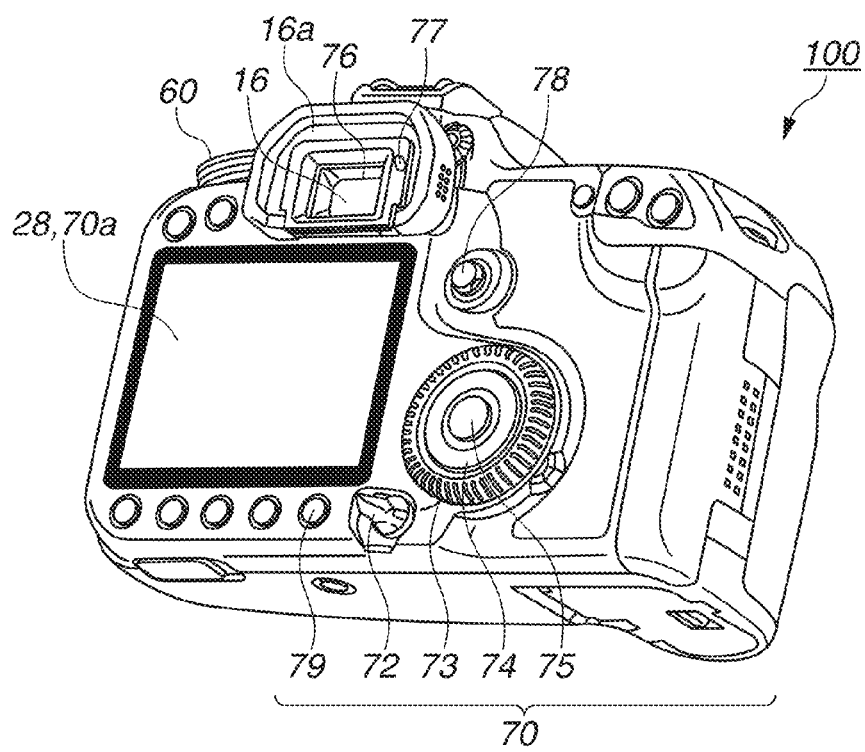

FIGS. 1A and 1B are external views of a digital camera as an example of an imaging control apparatus to which a first exemplary embodiment is applicable. FIG. 1A is a perspective view illustrating the front side of a digital camera 100, and FIG. 1B is a perspective view illustrating the back side of the digital camera 100. A display unit 28 displays an image and various kinds of information. A touch panel 70a capable of receiving a touch operation (capable of touch detection) is overlapped with the display unit 28. A shutter button 61 is an operation member for issuing an image capturing instruction. A mode selection switch 60 is a (selectable) operation member for selecting various modes. A terminal cover 40 protects connectors (not illustrated) such as a connecting cable for connecting the digital camera 100 and an external apparatus. A main electronic dial 71 is a rotary operation member included in the operation unit 70. Turning the main electronic dial 71 enables changing setting values such as a shutter speed and diaphragm settings. A power switch 72 is an operation member for turning power of the digital camera 100 ON and OFF. A sub electronic dial 73 is a rotary operation member included in the operation unit 70 and enables moving a selection frame and image feeding. A cross key 74 is a four-way operation key included in the operation unit 70. The left, right, top and bottom portions of the cross key 74 can be pressed. Operations corresponding to pressed portions of the cross key 74 are possible. A SET button 75 is a push button included in the operation unit 70. The SET button 75 is mainly used to determine a selection item. A live view (LV) button 78 is included in the operation unit 70. In the still image capturing mode, the LV button 78 turns live view display on the display unit 28 ON and OFF. In the moving image capturing mode, the LV button 78 is used to give an instruction to start and stop moving image capturing (recording). A playback button 79 is an operation button included in the operation unit 70. The playback button 79 switches between the image capturing mode and the reproducing mode. When the user presses the playback button 79 in the image capturing mode, the digital camera 100 enters the reproducing mode and displays on the display unit 28 the last captured image out of images recorded in a recording medium 200.

A grip portion 90 is a supporting portion (grasping portion) for operating the digital camera 100 while supporting it. The operation unit 70 is provided on the side of the grip portion 90.

By looking into a finder 16, the user is able to observe (visually recognize) a subject through an optical view finder (OVF). An eyepiece sensor 77 is an object detection unit for detecting an object approaching at a distance closer than a predetermined distance such as 1 or 2 centimeters (eye contact detection). For example, when the user brings the eyes to the finder 16 (looks into an eyepiece portion 16a) to observe an in-finder display unit and the eyepiece sensor 77 detects an object (eye) approaching, the display of the in-finder display unit 76 is superimposed on the subject observed through the OVF. Further, when the eyepiece sensor 77 detects that the object (eye) is separated by a predetermined distance, displayed items disappear from the in-finder display unit 76. When the user looks into the finder 16, the display unit 28 is not displayed but a touch operation on the touch panel 70a for setting the AF position can be received. In this case, if the user performs a touch operation on the touch panel 70a while grasping the grip portion 90 with a finger touching the shutter button 61, the user is able to quickly perform an AF position moving operation and image capturing instruction while observing the display on the in-finder display unit 76 (and the subject observed through the OVF). However, the display of the finder 16 may be an electronic view finder (EVF) instead of an OVF.

A lens unit 150 is detachably attached to the digital camera 100.

FIG. 2 is a block diagram illustrating an example of a configuration of the digital camera 100 according to the present exemplary embodiment.

Referring to FIG. 2, the lens unit 150 includes an exchangeable imaging lens. Although a lens 103 is composed of a plurality of lenses, it is simply illustrated as one lens. A communication terminal 6 is used by the lens unit 150 to communicate with the digital camera 100. A communication terminal 10 is used by the digital camera 100 to communicate the lens unit 150.

An AE sensor 17 measures the luminance of light of a subject (image) formed on a focusing screen 13 through the lens unit 150 and a quick return mirror 12.

At the time of exposure, live view image capturing, and moving image capturing, the quick return mirror 12 (hereinafter referred to as a mirror 12) is moved up and down by an actuator (not illustrated) through an instruction from a system control unit 50. The mirror 12 is used to switch the travelling direction of a light flux incident from the lens 103 between the side of the finder and the side of the imaging unit 22. Normally, the mirror 12 is arranged so as to reflect the light flux to the finder 16. In the case of image capturing and live view display, the mirror 12 flaps upward to evacuate from the light flux so as to lead the light flux to the imaging unit 22 (mirror up). The mirror 12 is partially a half mirror of which the central part transmits a part of light to enter a focus detection unit 11 for performing focus detection.

A photographer observes the image formed on the focusing screen 13 through a pentaprism 14 and the finder 16 to enable confirming the focusing state and composition of the optical image of the subject obtained through the lens unit 150.

The in-finder display unit 76 is a display unit arranged on the optical path from the lens 103 to the finder 16. The in-finder display unit 76 displays a frame indicating the current AF position and icons, e.g., items, marks, and signs, indicating setting statuses of the digital camera 100 through the system control unit 50. The focusing screen 13 and the in-finder display unit 76 are arranged at adjacent positions in an overlapped manner so that respective displays can be confirmed at one time. The focus detection unit 11 (AF sensor) employs the phase difference detection method which outputs defocus amount information based on the captured image to the system control unit 50. The system control unit 50 can control the lens unit 150 via the communication terminals 6 and 10. More specifically, the system control unit 50 performs phase difference AF based on the defocus amount information via an AF drive circuit 3 and performs phase difference AF by moving the position of the lens 103 (AF execution is possible). The AF method may be contrast AF instead of phase difference AF.

The imaging unit 22 is an image sensor such as a charge coupled device (CCD) sensor or complementary metal-oxide semiconductor (CMOS) sensor for converting an optical image into an electrical signal. An analog-to-digital (A/D) converter 23 converts an analog signal into a digital signal. The A/D converter 23 is used to convert an analog signal output from the imaging unit 22 into a digital signal.

An image processing unit 24 performs predetermined pixel interpolation, resizing processing such as reduction of size, and color conversion processing on data from the A/D converter 23 or data from the memory control unit 15. The image processing unit 24 performs predetermined calculation processing by using captured image data. The system control unit 50 performs exposure control and range finding control based on an obtained calculation result. This enables performing the AF processing, AE processing, and electronic flash preliminary emission (EF) processing using the Through The Lens (TTL) method. The image processing unit 24 further performs Automatic White Balance (AWB) processing using the TTL method based on a calculation result obtained by performing predetermined calculation processing by using captured image data.

The display unit 28 is a back monitor for displaying an image. The display unit 28 is not limited to a liquid crystal display, and may be other displays such as an organic Electro Luminescence (EL) display.

Output data from the A/D converter 23 is written in the memory 32 via the image processing unit 24 and the memory control unit 15 or directly via the memory control unit 15. The memory 32 stores image data captured by the imaging unit 22 and converted into digital data by the A/D converter 23, and stores image data to be displayed on the display unit 28. The memory 32 is provided with a sufficient storage capacity for storing a predetermined number of still images and moving images and sound for a predetermined time period. The memory 32 also serves as an image display memory (video memory). A digital-to-analog (D/A) converter 19 converts image display data stored in the memory 32 into an analog signal and supplies the analog signal to the display unit 28 and the in-finder display unit 76. In this way, the image display data written in the memory 32 is displayed on the display unit 28 and the in-finder display unit 76 via the D/A converter 19. The display unit 28 and the in-finder display unit 76 display images corresponding to the analog signal from the D/A converter 19 on a display such as a liquid crystal display (LCD). The digital signal generated through A/D conversion by the A/D converter 23 and stored in the memory 32 is converted into an analog signal by the D/A converter 19. Successively transmitting images to the display unit 28 (EVF when the in-finder display 76 is an EVF) to display them on the display unit 28 enables it to function as an electronic view finder enabling live view display.

A nonvolatile memory 56 is an electrically erasable recordable memory such as an electrically erasable programmable read only memory (EEPROM). Constants and programs for operations of the system control unit 50 are stored in the nonvolatile memory 56. The programs stored in the nonvolatile memory 56 refer to programs for executing various flowcharts (described below) according to the present exemplary embodiment.

The system control unit 50 controls the entire digital camera 100. Each piece of processing of the present exemplary embodiment (described below) is implemented when the system control unit 50 executes a program recorded in the above-described nonvolatile memory 56. Constants and variables for operations of the system control unit 50 and programs read from the nonvolatile memory 56 are loaded into the system memory 52. A random access memory (RAM) is used as the system memory 52. The system control unit 50 also performs display control by controlling the memory 32, the D/A converter 19, the display unit 28, and the in-finder display unit 76.

A system timer 53 is a time measurement unit for measuring time used for various control and time of a built-in clock.

The mode selection switch 60, the shutter button 61, and the operation unit 70 are operation units for inputting various operation instructions to the system control unit 50.

The mode selection switch 60 switches the operation mode of the system control unit 50 between the image capturing mode and the reproducing mode. Further, the digital camera 100 has various scene modes serving as image capturing settings for each image capturing scenes, the programmed AE mode, and a custom mode. The mode selection switch 60 enables the user to directly select one of these modes included in the menu screen. Alternatively, after once selecting the menu screen, the user may select either one of these modes included in the menu screen by using another operation member.

The first shutter switch 62 turns ON in the middle of an operation (i.e., half-stroke press) of the shutter button 61 provided on the digital camera 100 to generate a first shutter switch signal SW1 (half-stroke press means an image capturing preparation instruction). The first shutter switch signal SW1 causes the system control unit 50 to start operations including the AF processing, AE processing, AWB processing, and EF processing.

A second shutter switch 64 turns ON upon completion of an operation (full-stroke press) of the shutter button 61 to generate a second shutter switch signal SW2 (full-stroke press means an image capturing instruction). The second shutter switch signal SW2 causes the system control unit 50 to start a series of image capturing operations ranging from signal reading from the imaging unit 22 to image data writing in the recording medium 200.

When the user performs an operation for selecting one of various function icons displayed on the display unit 28, each operation member of the operation unit 70 is suitably assigned a function and serves as a function button for each scene. The operation unit 70 includes at least the following operation members: the shutter button 61, the main electronic dial 71, the power switch 72, the sub electronic dial 73, the cross key 74, the SET button 75, the LV button 78, and the playback button 79. The user is able to intuitively perform various settings by using the menu screen displayed on the display unit 28, the cross key (four-direction operation key), and the SET button.

A power supply control unit 80 includes a battery detection circuit, a direct current-to-direct current (DC-DC) converter, a switch circuit for selecting a block to be supplied with power, to detect the existence of a battery, the battery type, and the remaining battery capacity. The power supply control unit 80 also controls the DC-DC converter based on the result of detection and an instruction of the system control unit 50 to supply a required voltage to the recording medium 200 and other components for a required time period. The power switch 72 receives a power ON/OFF operation.

A power source unit 30 includes a primary battery (such as an alkaline battery and a lithium battery), a secondary battery (such as a NiCd battery, a NiMH battery, and a Li battery), and an alternating current (AC) adaptor. A recording medium interface (I/F) 18 is an interface with the recording medium 200 such as a memory card and a hard disk. The recording medium 200 is a recording medium such as a memory card for recording captured images, including a semiconductor memory and a magnetic disk.

A communication unit 54 wirelessly or wired establishes connection to perform transmission and reception of image signals and audio signals. The communication unit 54 can also connect to a wireless Local Area Network (LAN) and the Internet. The communication unit 54 can transmit images (including a live view) captured by the imaging unit 22 and images recorded in the recording medium 200 and receive image data and other various kinds of information from an external apparatus.

As a part of the operation unit 70, the digital camera 100 is provided with the touch panel 70a that can detect contact on the display unit 28. The touch panel 70a and the display unit 28 can be integrally formed. For example, the touch panel 70a is configured so that the transmissivity of light may not disturb the display of the display unit 28, and is attached to the upper layer of the display screen of the display unit 28. Then, the input coordinates of the touch panel 79a are associated with the display coordinates on the display unit 28. This enables configuring such a graphical user interface (GUI) that enables the user to directly operate the screen displayed on the display unit 28. A setting in which the position where a touch operation is performed is associated with the position on the display unit 28 and an instruction is received is referred to as an absolute coordinate setting.

Unlike the absolute coordinate setting, a setting in which an instruction from a predetermined position on the display unit 28 to a position as a result of the movement according to the moving amount and moving direction of a touch operation (a position as a result of the movement by an amount corresponding to the moving operation), not touch coordinates, is referred to as a relative coordinate setting.

When performing an operation while observing the in-finder display unit 76, if the user performs a touch operation with an absolute coordinate setting, the user will touch the touch panel 70a without observing it (display unit 28), the user is highly likely to perform an erroneous touch operation at a position different from the desired position. On the other hand, when the user performs a touch operation with a relative coordinate setting, the user issues a moving instruction based not on the position but on the moving amount of the touch operation. Therefore, when the user performs an operation for moving the operation target to a desired position while observing the position of the operation target displayed on the in-finder display unit 76, the user is able to issue an instruction for moving it to a desired position. The absolute coordinate setting and the relative coordinate setting can be selected in a touch pad setting of a menu screen. When the user performs an operation while observing the display unit 28 with a relative coordinate setting, the touch position and the instruction position may become different and the operability may possibly degrade operability. Therefore, when the touch panel 70a receives a touch operation with a relative coordinate setting when the eyepiece sensor 77 detects an object approaching, favorable operability is provided both when the user is observing the display unit 28 and when the user is observing the in-finder display unit 76. The function that the touch panel 70a receives a touch operation while no image is displayed on the display unit 28 is referred to as a touch pad function.

The system control unit 50 is able to detect the following operations and states on the touch panel 70a.

An operation to start touching the touch panel 70a with a finger or a pen (hereinafter referred to as a "touch-down")

A state where a finger or a pen is in contact with the touch panel 70a (hereinafter referred to as a "touch-on")

An operation to move a finger or a pen while being in contact with the touch panel 70a (hereinafter referred to as a "touch-move")

An operation to detach a finger or a pen from the touch panel 70a (hereinafter referred to as a "touch-up")

A state where a finger or a pen is not in contact with the touch panel 70a (hereinafter referred to as a "touch-off")

When a touch-down is detected, a touch-on is detected at the same time. After a touch-down, a touch-on is normally kept being detected until a touch-up is detected. A touch-move is also detected in a state where a touch-on is being detected. Even if a touch-on is detected, a touch-move is not detected if the touch position is not moving. After a touch-up is detected for all of fingers and a pen, a touch-off is detected.

These operations and states as well as position coordinates of the position where the finger or pen touches the touch panel 70a are notified to the system control unit 50 via an internal bus. Based on the notified information, the system control unit 50 determines which operation has been performed on the touch panel 70a. As for a touch-move, the moving direction of a finger or a pen moving on the touch panel 70a can be determined for each of the vertical and horizontal components on the touch panel 70a based on changes of the position coordinates. An operation in which a touch-on is detected and, without a touch-move, a touch-up is quickly performed is referred to as a tap. When a touch-down, a certain amount of a touch-move, and then a touch-up are performed, a stroke is drawn. An operation to quickly draw a stroke is referred to as a flick. A flick is an operation in which the user quickly moves the user's finger, while the finger is in contact with the touch panel 70a, over a predetermined distance or longer and then subsequently removes the finger therefrom. In other words, the user quickly flips the surface of the touch panel 70a with the finger. After detecting a touch-move at a predetermined speed or higher over a predetermined distance or longer, when a touch-up is subsequently detected, it can be determined that a flick has been performed. When a touch-move at a speed lower than a predetermined speed over a predetermined distance or longer is detected, it can be determined that a drag has been performed. The touch panel 70a may be of any one of various types including a resistance film type, a capacitance type, a surface elastic wave type, an infrared type, an electromagnetic induction type, an image recognition type, and an optical sensor type. Depending on the type, a touch is detected when a finger or a pen comes in contact with the touch panel 70a or when the finger or pen comes close to the touch panel 70a. Either type is applicable.

Figure 3A:
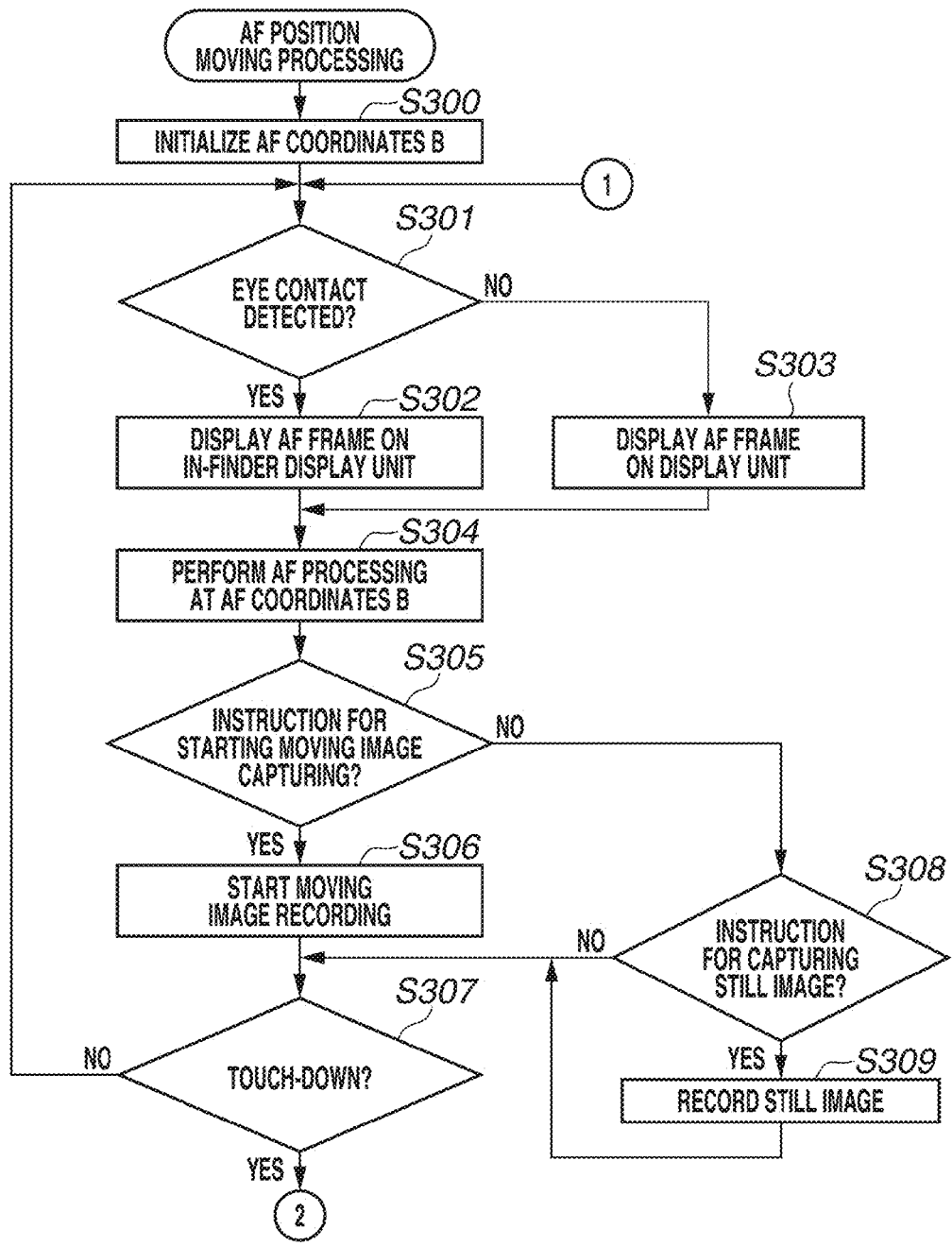
Figure 3C:
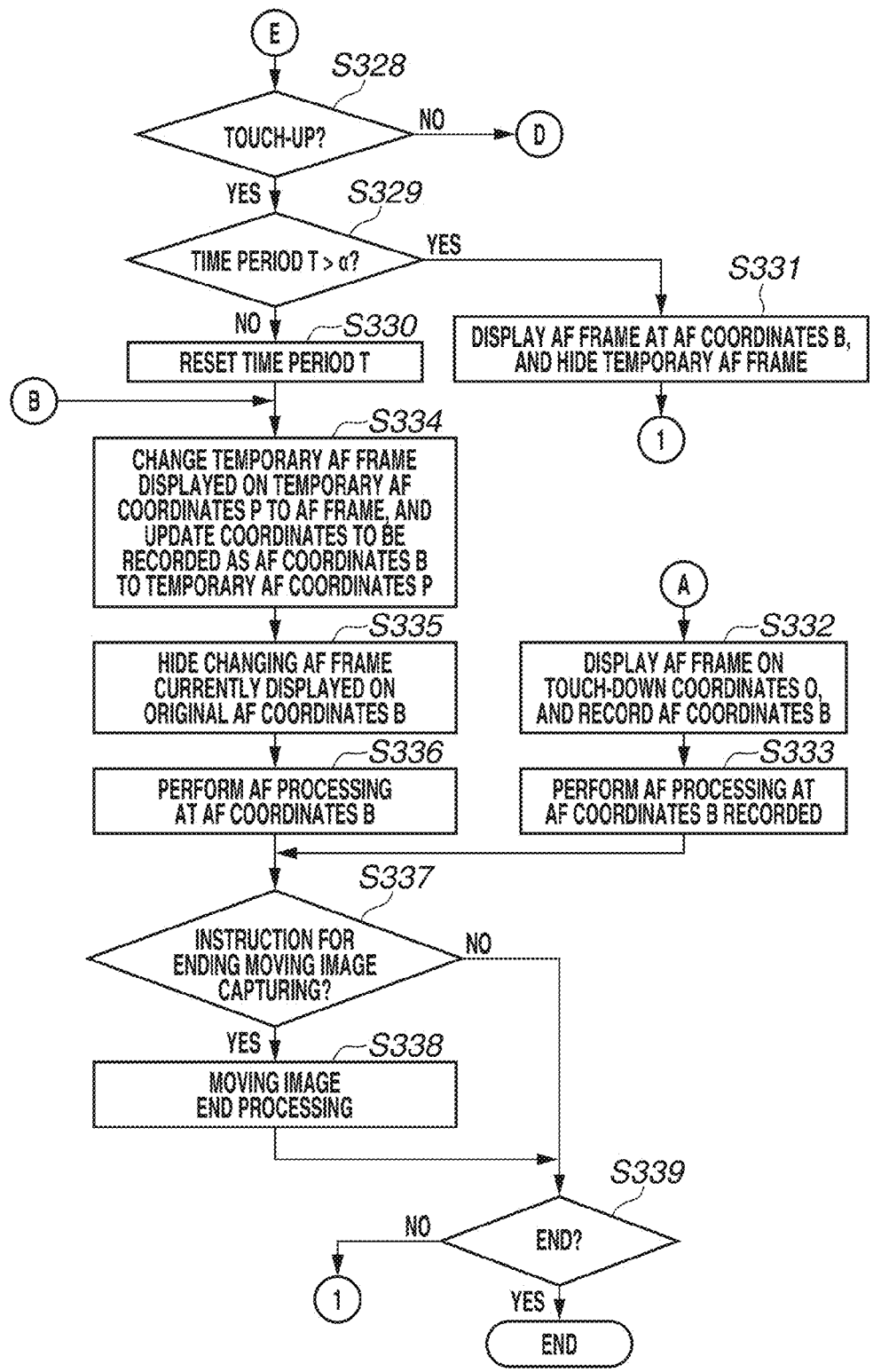

FIGS. 3A to 3C illustrate AF moving processing according to the first exemplary embodiment. This processing is implemented when a program recorded in the nonvolatile memory 56 is loaded into the system memory 52 and then executed by the system control unit 50. This processing is started when power of the digital camera 100 is turned ON and the image capturing mode is selected.

Figure 4A:
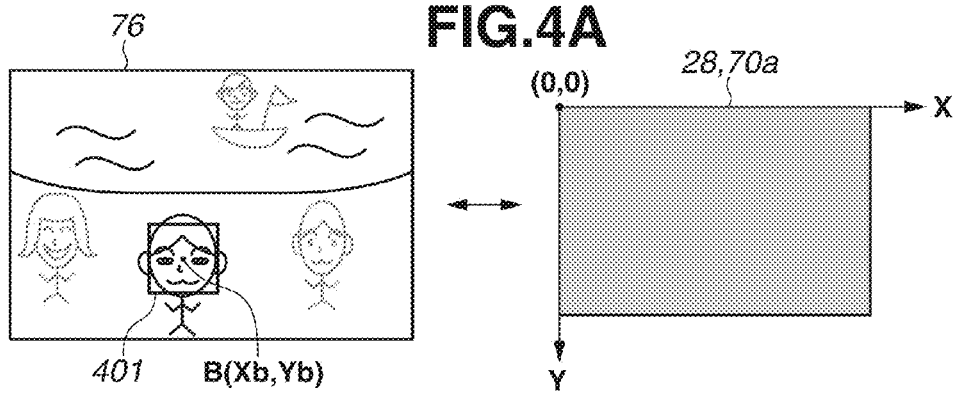
FIGS. 4A, 4B, 4C, and 4D illustrate states where an AF position is moved.
Figure 4B:
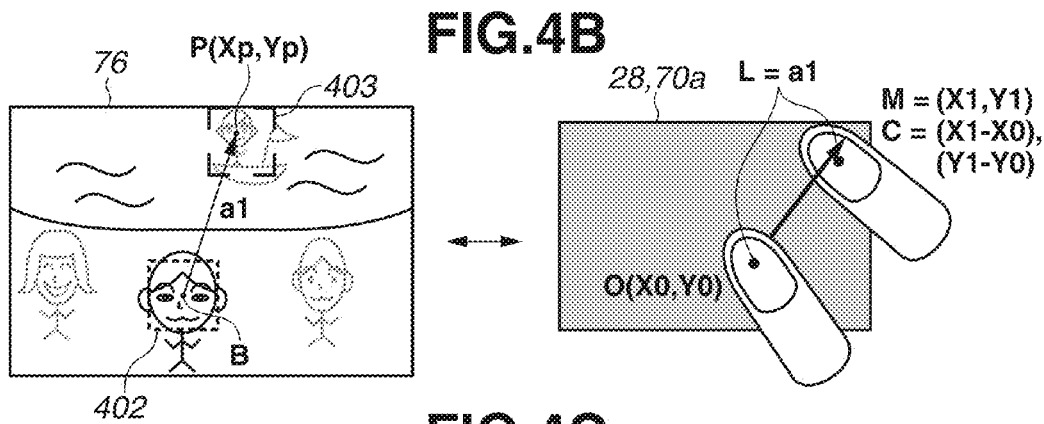
Figure 4C:
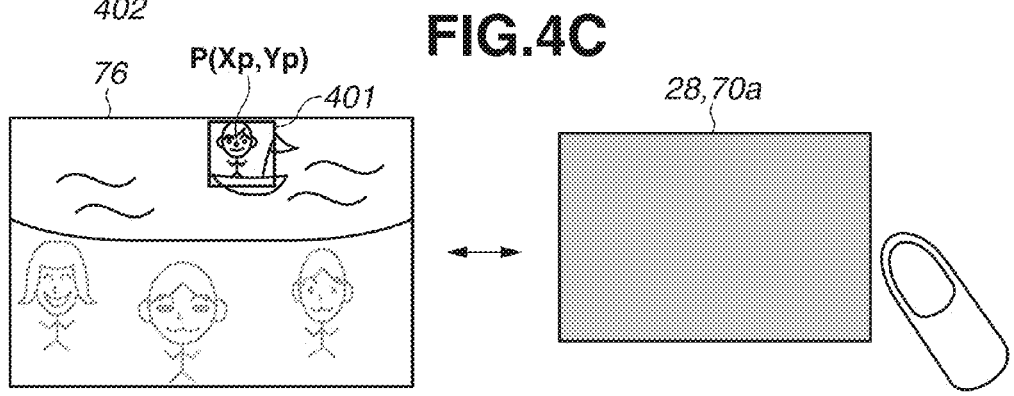

In step S300, the system control unit 50 initializes the AF coordinates B and records the AF coordinates B in the system memory 52. The position of the coordinates to be initialized is set to the position of a person's face detected as illustrated in FIG. 4A or the center position of the imaging region. However, the in-finder display unit 76 actually displays an AF frame 401 or a changing AF frame 402, and the subject is visually recognizable through the OVF. In a case of display not on the OVF but on the EVF, the system control unit 50 superimposes the AF frame 401 on the captured image captured by the imaging unit 22. FIG. 4A illustrates a state where the AF frame 401 is displayed at the AF coordinates B (Xb, Yb). FIGS. 4A to 4C illustrate examples of displays on the in-finder display unit 76 during AF position moving processing and touch operations on the touch panel 70a corresponding to each display on the in-finder display unit 76.

In step S301, the system control unit 50 determines whether the eyepiece sensor 77 detects (is detecting) an eye contact (approach detection). When the system control unit 50 determines that the eyepiece sensor has detected an eye contact (YES in step S301), the processing proceeds to step S302. On the other hand, when the system control unit 50 determines that the eyepiece sensor 77 has not detected an eye contact (NO in step S301), the processing proceeds to step S303.

In step S302, the system control unit 50 displays the AF frame 401 at the current AF position of the in-finder display unit 76 (the AF coordinates B recorded in step S300 or the AF coordinates B set in step S334 or S333 (described below)). More specifically, in a case where an AF position is already set in the AF position moving processing, the set position is the AF coordinates B when the processing returns to step S302, and the image capturing mode is selected for the first time after tuning power ON, the detected face position or the center position of the imaging region is set to be at the AF coordinates B. The system control unit 50 further displays the AF frame 401 (mark or index) at the AF coordinates B.

In step S303, the system control unit 50 displays the AF frame 401 at the position of the AF coordinates B of the display unit 28 (not illustrated).

In step S304, the system control unit 50 performs processing for performing AF on the position of the AF coordinates B. However, the system control unit 50 does not always need to perform the AF processing in step S304, and may perform the AF processing in step S304 only when the user sets continuous AF.

In step S305, the system control unit 50 determines whether an instruction for starting moving image capturing is issued. The instruction for starting moving image capturing can also be performed by pressing the LV button 78. When the system control unit 50 determines that the instruction for starting moving image capturing has been performed (YES in step S305), the processing proceeds to step S306. On the other hand, when the system control unit 50 determines that the instruction for starting moving image capturing has not been performed (NO in step S305), the processing proceeds to step S308.

In step S306, the system control unit 50 starts moving image recording (start of recording) and records the image captured by the imaging unit 22 in the recording medium 200 as a moving image. In this case, if the AF processing is performed on the AF position set by the user, a moving image in which the subject desired by the user is in-focused is recorded.

In step S307, the system control unit 50 determines whether a touch-down has been performed on the touch panel 70a. When the system control unit 50 determines that a touch-down has been performed (YES in step S307), the processing proceeds to step S310. When the system control unit 50 determines that a touch-down has not been performed (NO in step S307), the processing returns to step S301.

In step S308, the system control unit 50 determines whether an instruction for capturing a still image has been performed. The instruction for capturing a still image can be performed by pressing the shutter button 61. When the system control unit 50 determines that the instruction for capturing a still image has been performed (YES in step S308), the processing proceeds to step S309. On the other hand, when the system control unit 50 determines that the instruction for capturing a still image has not been performed (NO in step S308), the processing proceeds to step S307.

In step S309, the system control unit 50 records the image captured by the imaging unit 22 in the recording medium 200. In this case, the system control unit 50 performs the AF processing on the set AF coordinates B according to the detection of the press of SW1, and records the captured image having undergone the AF processing at the AF coordinates B according to the detection of the depression of SW2. More specifically, the system control unit 50 records the captured image in which the object desired by the user is focused.

In step S310, the system control unit 50 determines whether a set touch pad setting is a relative coordinate setting. When the system control unit 50 determines that the set touch pad setting is a relative coordinate setting (YES in step S310), the processing proceeds to step S311. On the other hand, when the system control unit 50 determines that the set touch pad setting is not a relative coordinate setting (NO in step S310), the processing proceeds to step S332.

In step S311, the system control unit 50 determines whether the eyepiece sensor 77 has detected (is detecting) an eye contact. When the system control unit 50 determines that the eyepiece sensor 77 has detected an eye contact (YES in step S311), the processing proceeds to step S312. On the other hand, when the system control unit 50 determines that the eyepiece sensor 77 has not detected an eye contact (NO in step S311), the processing proceeds to step S332. As described above, in a case where the touch pad setting is a relative coordinate setting and the eyepiece sensor 77 has detected an eye contact, the system control unit 50 proceeds to the AF position moving processing with a relative coordinate input in steps S312 to S325. On the other hand, in a case where the touch pad setting is an absolute coordinate setting or in a case where the touch pad setting is a relative coordinate setting and the eyepiece sensor 77 has not detected an eye contact, the system control unit 50 proceeds to the AF position moving processing with an absolute coordinate input in steps S332 and S333.

In step S312, the system control unit 50 starts measuring the time period T by using the system timer 53. The time period T is required to determine whether the touch operation detected by the touch panel 70a is a tap operation with a short touch time. More specifically, the system control unit 50 starts measuring the time period since the time when a touch-down is detected until the time when a touch-up is detected without a touch-move performed.

In step S313, the system control unit 50 acquires touch-down coordinates O and records the touch-down coordinates O in the system memory 52. In the coordinate system of the touch panel 70a, the x axis is provided in the horizontal direction, the y-axis is provided in the vertical direction, and the origin is set at the upper left corner, as illustrated in FIG. 4A. The touch-down coordinates O is set to (X0, Y0).

In step S314, the system control unit 50 determines whether a touch-move has been performed. When a moving operation in contact with the touch panel 70a is detected over a predetermined distance or longer from the point where a touch-down is detected, the system control unit 50 determines that a touch-move has been performed. The predetermined distance is, for example, 1 or 0.5 centimeters. If the touch operation moves a distance shorter than the predetermined distance, the system control unit detects the operation not as a touch-move but as a process of a tap operation in which the touch position is unintentionally moved. When the system control unit 50 determines that a touch-move has been performed (YES in step S314), the processing proceeds to step S315. On the other hand, when the system control unit 50 determines that a touch-move has not been performed (NO in step S314), the processing proceeds to step S328.

In step S315, the system control unit 50 resets the time period T when measurement has been started in step S312 to 0 (T=0). Even if a touch-up (touch-up operation) has been performed immediately after detection of a touch-move, the system control unit 50 detects the operation as the end of a touch-move. Therefore, the system control unit 50 resets the measurement of the time period T for determining whether a tap has been performed.

In step S316, the system control unit 50 changes the AF frame currently displayed at the AF coordinates B to the changing AF frame 402 indicating that the AF position is currently being changed. FIG. 4B illustrates an example of display of the in-finder display unit 76 after a touch-move is detected, and an example of a touch operation on the touch panel 70a corresponding to the display. As illustrated in FIG. 4B, the system control unit 50 changes the AF frame 401 having been displayed at the AF coordinates B to the changing AF frame 402 indicating that the AF position is currently being changed. More specifically, the system control unit 50 displays the changing AF frame 402 at the AF coordinates B. In this case, the position subjected to the AF processing remains at the position where the changing AF frame 402 is displayed, the AF position remains unchanged from that in step S302 or S303.

In step S317, the system control unit 50 acquires coordinates of the current touch position (touch coordinates M (Xm, Ym)).

In step S318, the system control unit 50 calculates relative coordinates C(Xc, Yc)=((Xm−X0), (Ym−Y0)) based on the touch-down coordinates O and the touch coordinates M. The relative coordinates C at the touch-down position illustrated in FIG. 4B is ((X1−X0), (Y1−Y0)). A distance L from the touch-down coordinates O to the touch coordinates M is al.

In step S319, the system control unit 50 calculates temporary AF coordinates P based on the AF coordinates B and the relative coordinates C calculated in step S318, and displays the temporary AF frame 403 at the temporary AF coordinates P. The temporary AF coordinates P is obtained by adding the AF coordinates B and the relative coordinates C, i.e., ((Xb+Xc), (Yb+Yc)). As illustrated in FIG. 4B, the system control unit 50 displays the temporary AF frame 403 at the position of the calculated temporary AF coordinates P. Although the AF processing has not yet been performed on the position where the temporary AF frame 403 is displayed, the AF processing will be performed on the position where the temporary AF frame 403 is displayed according to the detection of a touch-up (described below) or a tap.

In step S320, the system control unit 50 determines whether a touch-up from the touch panel 70a has been performed. When the system control unit 50 determines that a touch-up has been performed (YES in step S320), the processing proceeds to step S321. On the other hand, when the system control unit 50 determines that a touch-up has not been performed (NO in step S320), the processing proceeds to step S317.

In step S321, the system control unit 50 determines whether a moving image is currently being captured (currently being recorded). When the system control unit 50 determines that a moving image is currently being captured (currently being recorded) (YES in step S321), the processing proceeds to step S322. On the other hand, when the system control unit determines that a moving image is not currently being captured (currently not being recorded) (NO in step S321), the processing proceeds to step S334.

In step S322, the system control unit 50 starts measuring a time period S by using the system timer 53. The time period S is required to determine whether a predetermined time has elapsed without an operation for determining the AF position (described below) performed since a touch-move for moving the temporary AF position and then a touch-up have been performed. When a predetermined time period has elapsed, the coordinates on which the temporary AF frame 403 is displayed is reset and the original state (step S301) is restored assuming that an AF position moving operation has not been performed. In this case, a guide may be displayed on the in-finder display unit 76 to indicate that the AF position can be determined by performing a tap operation.

In step S323, the system control unit 50 determines whether the elapsed time period S is longer than a predetermined time period β. When the system control unit 50 determines that the elapsed time period S is longer than the predetermined time period β (YES in step S323), the processing proceeds to step S324. On the other hand, when the system control unit 50 determines that the elapsed time period S is not longer (is equal to or shorter) than the predetermined time period β (NO in step S323), the processing proceeds to step S326. The predetermined time period β is such a time length as 10 or 12 seconds.

In step S324, the system control unit 50 changes the changing AF frame 402 having been displayed at the AF coordinates B illustrated in FIG. 4B to the AF frame 401 and displays the AF frame 401 at the AF coordinates B as illustrated in FIG. 4A. Then, the system control unit 50 hides the temporary AF frame 403. When a time period longer than the predetermined time has elapsed without an operation for determining the AF position performed from step S322, the user is highly likely to have no intention to move the AF position to the position of the temporary AF coordinates P where a moving operation has been performed or is highly likely to think that the original AF position may remain unchanged. Therefore, the system control unit 50 leaves the AF position at the AF coordinates B unchanged without moving the AF position to the position of the temporary AF coordinates P.

In step S325, the system control unit 50 resets the time period S to 0 (S=0).

In step S326, the system control unit 50 determines whether a touch-down has been performed on the touch panel 70a. When the system control unit 50 determines that a touch-down has been performed (YES in step S326), the processing proceeds to step S327. When the system control unit 50 determines that a touch-down has not been performed (NO in step S326), the processing returns to step S323.

In step S327, the system control unit 50 resets the time period S to 0 (S=0).

In step S328, the system control unit 50 determines whether a touch-up from the touch panel 70a has been performed. When the system control unit 50 determines that a touch-up has been performed (YES in step S328), the processing proceeds to step S329. When the system control unit 50 determines that a touch-up has not been performed (NO in step S328), the processing returns to step S314.

In step S329, the system control unit 50 determines whether the elapsed time period T is longer than a predetermined time period α. When the system control unit 50 determines that the elapsed time period T is longer than the predetermined time period α (YES in step S329), the processing proceeds to step S331. On the other hand, when the system control unit 50 determines that the elapsed time period T is not longer than the predetermined time period α (i.e., when a touch operation has been performed) (NO in step S329), the processing proceeds to step S330. The predetermined time period α is such a time length as 1 or 0.5 seconds.

In step S330, the system control unit 50 resets the time period T to 0 (T=0).

In step S331, the system control unit 50 changes the changing AF frame 402 having been displayed at the AF coordinates B illustrated in FIG. 4B to the AF frame 401, and displays the AF frame 401 at the AF coordinates B as illustrated in FIG. 4A. Then, the system control unit 50 hides the temporary AF frame 403. More specifically, in a case of a touch for a time period longer than the predetermined time period α (long-time depression), not a tap operation performed for a time period shorter than the predetermined time period α, the system control unit 50 leaves the AF position at the AF coordinates B before the touch operation (detection of the movement of the touch position) unchanged without moving the AF position to the temporary AF coordinates P.

The processing in steps S332 to S333 is performed in a case where the touch pad setting is an absolute coordinate setting or in a case where, although the touch pad setting is a relative coordinate setting, a touch operation is received with an absolute coordinate setting when the eyepiece sensor 77 does not detect eye contact. In the case where the touch pad setting is an absolute coordinate setting, the system control unit 50 performs the AF processing on the position where a touch-down has been performed.

Figure 4D:
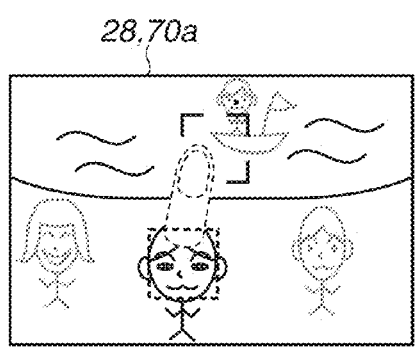

In step S332, the system control unit 50 displays the AF frame 401 at the touch-down coordinates O and records the coordinates in the system memory 52 as the AF coordinates B (=touch-down coordinates O). FIG. 4D illustrates a state of the AF frame movement in a case where an image is displayed on the display unit 28 with an absolute coordinate setting. In a state where the eye does not contact the eyepiece portion 16a, the user may perform a touch operation at the position on the display unit 28 where an object subjected to the AF processing is displayed.

In step S333, the system control unit 50 performs the AF processing on the position of the AF coordinates B recorded in the system memory 52 in step S332.

The processing in steps S334 to S336 indicates processing relating to the AF processing on the position as a result of the movement in a case where an AF position moving operation with a relative coordinate setting has been received.

In step S334, the system control unit 50 changes the temporary AF frame 403 having been displayed at the temporary AF coordinates P to the AF frame 401. Further, the system control unit 50 updates the coordinates to be recorded in the system memory 52 as the AF coordinates B from the coordinates recorded in step S300 or S334 to the temporary AF frame coordinates P.

In step S335, the system control unit 50 hides the changing AF frame 402 currently being displayed at the AF coordinates B. FIG. 4C illustrates states of the in-finder display unit 76 and the touch panel 70a after the AF position is changed, in which the AF coordinates has been moved from the AF coordinates B illustrated in FIG. 4A. In the moving image capturing, the AF position is determined when the user moves the temporary AF frame 403 and then performs a tap operation (operation for determining the AF position), as illustrated in FIG. 4B. During still image capturing and waiting for moving image recording, the AF position is determined when the user moves the temporary AF frame 403 and then performs a touch-up as illustrated in FIG. 4B.

In step S336, the system control unit 50 performs the AF processing on the position of the AF coordinates B recorded in the system memory 52 in step S334.

In step S337, the system control unit 50 determines whether an instruction for ending moving image capturing is issued. The instruction for ending moving image capturing can be issued by pressing the LV button 78 during moving image capturing. However, the system control unit 50 does not perform the determination in step S337 at timings other than moving image capturing. When the system control unit 50 determines that the instruction for ending moving image capturing has been issued (YES in step S337), the processing proceeds to step S338. On the other hand, when the system control unit 50 determines that the instruction for ending moving image capturing has not been issued (NO in step S337), the processing proceeds to step S339.

In step S338, the system control unit 50 performs moving image end processing. The moving image end processing refers to such processing that makes a generated moving image file reproducible, for example, by generating captured moving image file attribute information, inter-frame information, a thumbnail, and performing compression processing. These pieces of information are stored in the recording medium 200 together with the moving image file.

In step S339, the system control unit 50 determines whether an end operation has been performed. End operations include an operation for selecting the reproducing mode and an operation for turning power OFF. When the system control unit 50 determines that an end operation has been performed (YES in step S339), the system control unit 50 ends the AF position moving processing. When the system control unit 50 determines that an end operation has not been performed (NO in step S339), the processing returns to step S301.

According to the above-described exemplary embodiment, the AF position can be changed with favorable operability during moving image recording and at other timings. When a moving image is currently being recorded when changing the AF position with a touch operation (YES in step S321), the system control unit 50 does not perform the AF processing immediately after performing a moving operation but changes the position to be subjected to the AF processing according to the determination operation. As a result, this processing reduces the possibility that the AF position is changed at an unintended timing in the middle of moving image recording and the possibility that the AF processing is performed on an unintended position in the middle of a moving operation. Performing a tap operation after a moving operation enables performing the AF processing on the position where the temporary AF frame 403 is displayed at a desired timing. This makes it easier to obtain a moving image in which the AF position is changed at a desired timing and at a desired position.

In a case of timings other than moving image recording (before and after still image capturing and during waiting for moving image recording according to the present exemplary embodiment (NO in step S321)), the system control unit 50 performs the AF processing on the changed position according to an AF position moving operation and then a touch-up from the touch panel 70a (steps S334 to S336). More specifically, immediately after moving the temporary AF frame 403 and then performing a touch-up, the AF processing is performed on the position of the temporary AF frame 403 (the temporary AF frame 403 changes to the AF frame 401), enabling quickly changing the AF position. The ability to quickly change the AF position reduces the possibility of missing imaging opportunities during AF position setting.

Since the system control unit 50 changes the timing of changing the AF position depending on whether a moving image is being recorded in this way, the AF position changing operation can be performed with favorable operability.

The system control unit 50 also changes the display formats of the frames for indicating positions relating to the AF position, such as the AF frame 401, the changing AF frame 402, and the temporary AF frame 403. This enables the user to easily grasp the position (the AF frame 401 and the changing AF frame 402) where the AF processing is actually being performed, and the position (the temporary AF frame 403) which is to be set as the AF position.

Although, in the above-described first exemplary embodiment, the system control unit 50 leaves the AF position at the AF coordinates B unchanged when the predetermined time period β has elapsed in step S323, a cancelling operation may be received. If the position where the temporary AF frame is currently displayed is a position unintended by the user, the system control unit 50 enables the user to quickly cancel the position of the temporary AF frame (cancel processing) and set a new AF frame or to return to the position before the moving operation. More specifically, after performing a touch-up, the user is able to cancel the temporary AF frame by performing a predetermined touch operation such as a long touch (keep touching for 2 or 3 seconds) and a multi-touch (touch two or three points) even without waiting for the predetermined time period R. In this case, if the user does not perform a cancelling operation even after the predetermined time period β has elapsed, the system control unit 50 may determine that the user approves the position where the temporary AF frame is currently being displayed and, after the predetermined time period β has elapsed, perform processing (processing in step S334 and subsequent steps) for determining the AF coordinates.

Although, in the above-described step S324, the system control unit 50 hides the temporary AF frame 403, the processing is not limited thereto. The system control unit 50 may change the color or size of the frame. When the display format of the temporary AF frame 403 is changed, the user recognizes that the AF position is not being moved but determined or that the temporary AF position being moved has been canceled and the AF frame returned to the original position. However, the position where the AF frame is displayed remains unchanged even if the display format has been changed.

According to the above-described first exemplary embodiment, the user performs a touch operation on the display unit 28 (touch panel 70*a*) of the digital camera 100 while looking into the in-finder display unit 76 to perform the AF position moving processing. A second exemplary embodiment will be described below focusing on a case where an instruction is received from a remote control at a separate position and the AF position is changed. In this case, on the remote control side, the user will perform an operation while observing the display unit on the digital camera at a separate position or the display panel of the remote control. In a case of remote imaging and in a case where a plurality of persons operate a plurality of parameter settings, such as the AF and exposure, in parallel, the use of a remote controller 504 makes it easier to perform each operation.

Figure 5A:
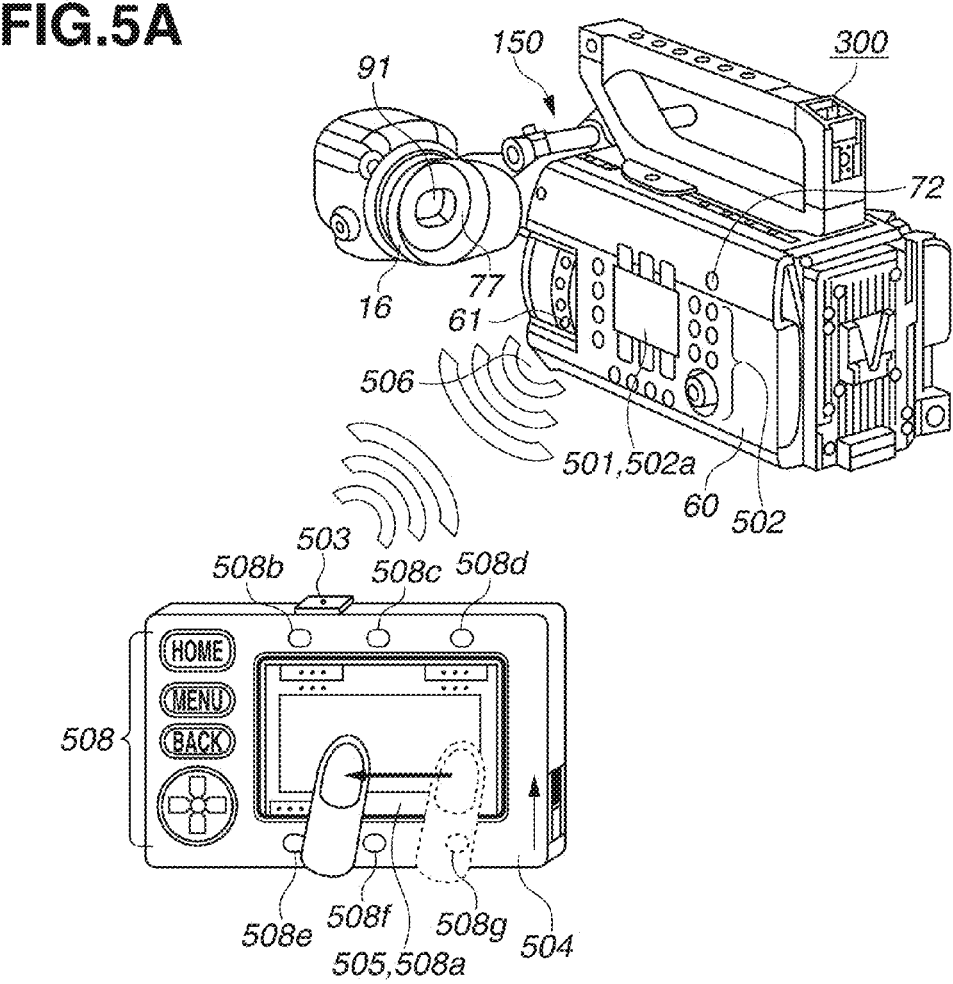
FIGS. 5A and 5B are external views illustrating a digital camera as an example of an apparatus to which a configuration of a second exemplary embodiment is applicable.
Figure 5B:
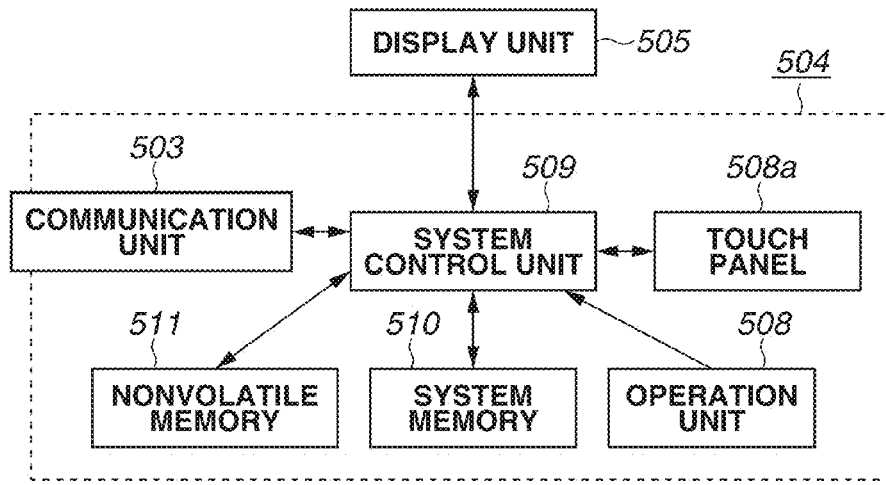

FIGS. 5A and 5B illustrate a digital camera 300 as an example of an imaging control apparatus to which the second exemplary embodiment is applicable.

FIG. 5A illustrates a state where the remote controller 504 and the digital camera 300 according to the present exemplary embodiment are wirelessly communicating with each other. The configuration of the digital camera 300 is similar to that according to the first exemplary embodiment illustrated in FIG. 2. The digital camera 100 according to the first exemplary embodiment illustrated in FIGS. 1A and 1B is provided with the display unit 28 on its back side. The digital camera 300 according to the present exemplary embodiment is provided with a display unit 501 and a touch panel 502*a* on its side surface. The digital camera 300 is further provided with not an OVF but an EVF 512 at a position away from the main body of the digital camera 300. Captured images captured by an imaging unit 22 on the main body can be displayed on the EVF 512.

The digital camera 300 is provided with an operation unit 502 for inputting various operation instructions to the system control unit 50 similar to the operation unit 70 according to the first exemplary embodiment. A communication unit 506 performs wireless (or wired) communication with a remote controller 504 as with the communication unit 54 according to the first exemplary embodiment.

FIG. 5A illustrates the remote controller 504. FIG. 5B illustrates an example of a configuration of the remote controller 504. A touch panel 508*a* on the remote controller 504 is able to detect touch operations. Similar to the touch panel 70*a* according to the first exemplary embodiment, the remote controller 504 is able to detect touch operations and coordinates of touch positions. Similar to the operation unit 70 according to the first exemplary embodiment, an operation unit 508 is provided on the remote controller 504 for inputting various operation instructions to a system control unit 509. The communication unit 503 enables performing wired or wireless communication with the digital camera 300. Touch operations and touch position coordinates detected by the touch panel 508*a* can be transmitted to the digital camera 300 via the communication unit 503 (transmission control). Constants and variables for operations of the system control unit 509 and programs read from a nonvolatile memory 511 are loaded into the system memory 510 (RAM). The nonvolatile memory 511 is an electrically erasable recordable memory such as an EEPROM. Constants and programs for operations of the system control unit 509 are stored in the nonvolatile memory 511. The touch panel 508*a* does not display a captured image captured by the imaging unit 22 of the digital camera 300. A user who operates the remote controller 504 while observing the video image data on the display unit 501 of the digital camera 300. To display an image also on the remote controller 504, a large amount of data needs to be exchanged between the digital camera 300 and the remote controller 504. Therefore, the smaller data amount causes a less delay of data transmission and reception. The remote controller 504 transmits and receives not the absolute coordinates but the relative coordinates of the touch position detected on the touch panel 508*a* of the remote controller 504.

Figure 6B:
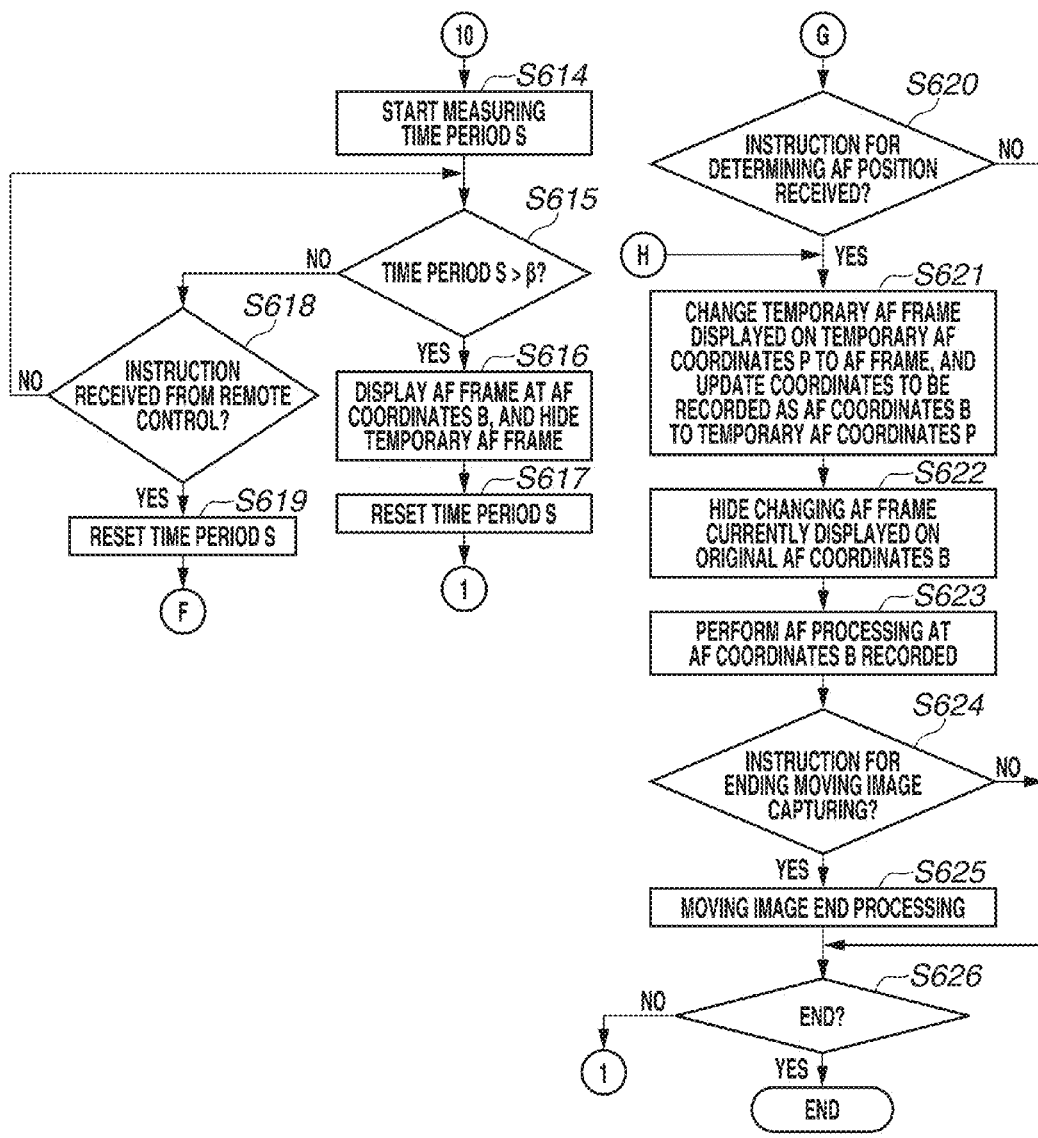

The AF position moving processing according to the second exemplary embodiment will be described below with reference to FIGS. 6A and 6B. This processing is implemented when a program recorded in the nonvolatile memory 56 is loaded into the system memory 52 and then executed by the system control unit 50. This processing is started when power of the digital camera 300 and the remote controller 504 is turned ON, the image capturing mode is selected, and communication between the remote controller 504 and the digital camera 300 is established. More specifically, the processing is started when the touch panel 508*a* of the remote controller 504 becomes ready to receive a touch operation and the digital camera 300 becomes ready to receive an instruction from the remote controller 504 and perform the AF processing in response to an instruction from the remote controller 504. Although, in the present exemplary embodiment, the system control unit 50 performs the AF position moving processing in response to an instruction from the remote controller 504, the system control unit 50 may receive an instruction on the display unit 501 (touch panel 502*a*) of the digital camera 300, as described in the first exemplary embodiment. The second exemplary embodiment handles the in-finder display unit 76 according to the first exemplary embodiment and the EVF 512 according to the second exemplary embodiment in a similar way.

In step S600, the system control unit 50 initializes the AF coordinates B like in step S300 illustrated in FIG. 3A and records the AF coordinates B in the system memory 52.

In step S601, the system control unit 50 displays the AF frame 401 at the position of the AF coordinates B on the display unit 501 and the EVF 512.

In step S602, the system control unit 50 performs processing for automatically focusing on the AF coordinates B recorded in step S601.

The processing in steps S603 to S604 is similar to the processing in steps S305 to S306 illustrated in FIG. 3A.

The processing in steps S605 and S606 is similar to the processing in steps S308 and S309 illustrated in FIG. 3A.

In step S607, the system control unit 50 determines whether an instruction has been received from the remote controller 504 via the communication unit 503. When the system control unit 50 determines that an instruction has been received from the remote controller 504 (YES in step S607), the processing proceeds to step S608. When the system control unit 50 determines that an instruction has not been received from the remote controller 504 (NO in step S607), the processing returns to step S603. When the user performs an operation on the touch panel 508a or the operation unit 508 of the remote controller 504, the remote controller 504 transmits an instruction to the digital camera 300 via the communication unit 503.

In step S608, the system control unit 50 determines whether the instruction received from the remote controller 504 is an instruction for moving the AF position. The instruction for moving the AF position is transmitted to the digital camera 300 via the communication unit 503 when the movement of a touch position (touch-move) is detected on the touch panel 508a of the remote controller 504. When the system control unit 50 determines that the instruction for moving the AF position has been received (YES in step S608), the processing proceeds to step S609. On the other hand, when the system control unit determines that the instruction for moving the AF position has not been received (NO in step S608), the processing proceeds to step S620.

In step S609, similar to step S316 illustrated in FIG. 3B, the system control unit 50 changes the AF frame 401 currently being displayed at the AF coordinates B to the changing AF frame 402 indicating that the AF position is currently being changed.

In step S610, the system control unit 50 acquires via the communication unit 503 the coordinate moving amount C' (moving distance and direction) of the touch-move on the remote controller 504. The system control unit 50 may receive information about the moving amount of a touch-move in step S607 or receive the moving amount of a touch-move each time a touch-move is detected by the remote controller 504.

In step S611, the system control unit 50 calculates the temporary AF coordinates P based on the AF coordinates B and the coordinate moving amount C' received in step S610 and displays the temporary AF frame 403. The temporary AF coordinates P is the sum of the AF coordinates B and the coordinate moving amount C'. As illustrated in FIG. 4B, the system control unit 50 displays the temporary AF frame 403 at the position of the calculated temporary AF coordinates P.

In step S612, the system control unit 50 determines whether an instruction for ending AF position movement has been received. The instruction for ending AF position movement is a touch-up from the touch panel 508a of the remote controller 504. This instruction is transmitted to the digital camera 300 via the communication unit 503 upon reception of an operation for ending a touch-move, i.e., the instruction for moving the AF position received in step S608.

In step S613, the system control unit 50 determines whether a moving image is currently being captured (a moving image is currently being recorded). When the system control unit 50 determines that a moving image is currently being captured (a moving image is currently being recorded) (YES in step S613), the processing proceeds to step S614. On the other hand, when the system control unit 50 determines that a moving image is not currently being captured (before and after still image capturing, during waiting for moving image recording) (NO in step S613), the processing proceeds to step S621.

The processing in steps S614 to S617 is similar to the processing in steps S322 to S325 illustrated in FIG. 3B.

In step S618, the system control unit 50 determines whether an instruction has been received from the remote controller 504 via the communication unit 503. When the system control unit 50 determines that an instruction has been received from the remote controller 504 (YES in step S618), the processing proceeds to step S619. When the system control unit 50 determines that an instruction has not been received from the remote controller 504 (NO in step S618), the processing returns to step S615. Thus, the system control unit 50 waits for the next instruction from the remote controller 504 since the instruction for ending AF position movement was received until the time period β has elapsed.

In step S619, the system control unit 50 resets the time period S to 0 (S=0).

In step S620, the system control unit 50 determines whether the instruction received from the remote controller 504 in step S607 is an instruction for determining the AF position. The instruction for determining the AF position is transmitted to the digital camera 300 via the communication unit 503 in response to the detection of a tap operation on the touch panel 508a of the remote controller 504. When the system control unit 50 determines that the instruction for determining the AF position has been received (YES in step S620), the processing proceeds to step S621. On the other hand, when the system control unit 50 determines that the instruction for determining the AF position has not been received (NO in step S620), the processing proceeds to step S626.

The processing in steps S621 to S626 is similar to the processing in steps S334 to S339 illustrated in FIG. 3C.

According to the above-described exemplary embodiments, the AF position can be changed with favorable operability during moving image recording and at other timings. When a moving image is currently being recorded (YES in step S613), the system control unit 50 does not perform the AF processing immediately after reception of the instruction for moving the AF position but performs the AF processing at the position changed in response to the determination operation. At timings other than moving image recording (before and after still image capturing, during waiting for moving image recording (NO in step S613)), the system control unit 50 performs the AF position moving operation. Then, upon reception of an end instruction, the system control unit 50 performs the AF processing at the changed position (steps S621 to S623).

This processing eliminates the need of transmitting and receiving captured images and therefore processes a smaller amount of communication data than in processing for successively transmitting captured images to the display unit 505 of the remote controller 504 and specifying the AF position with the absolute coordinates through a touch operation on the subject in each displayed captured image. Therefore, timing delay due to a data communication delay hardly occur. Reception of instructions on the remote controller 504 enables the user to issue an instruction for moving the AF position at a suitable timing while observing the state of the subject displayed on the display unit 501 at a separate position.

Modification of Second Exemplary Embodiment

A modification of the second exemplary embodiment performs processing for instructing to perform the AF processing through a remote control operation similar to the second exemplary embodiment. The modification differs from the second exemplary embodiment in the operating entity which performs determination according to a performed touch operation. According to the second exemplary embodiment, in response to a touch operation received by the remote controller 504, the remote controller 504 determines the processing corresponding to the touch operation and transmits an instruction for performing the processing to the digital camera 300. According to the modification of the second exemplary embodiment, unlike the second exemplary embodiment, the digital camera 300 receives a command relating to an operation detected by the remote controller 504 and performs the processing corresponding to the received command.

FIGS. 5A and 5B illustrate the digital camera 300 and the remote controller 504 as examples of imaging control apparatuses to which the modification of the second exemplary embodiment is applicable. The configurations of the digital camera 300 and the remote controller 504 are similar to those in the second exemplary embodiment.

Figure 7B:
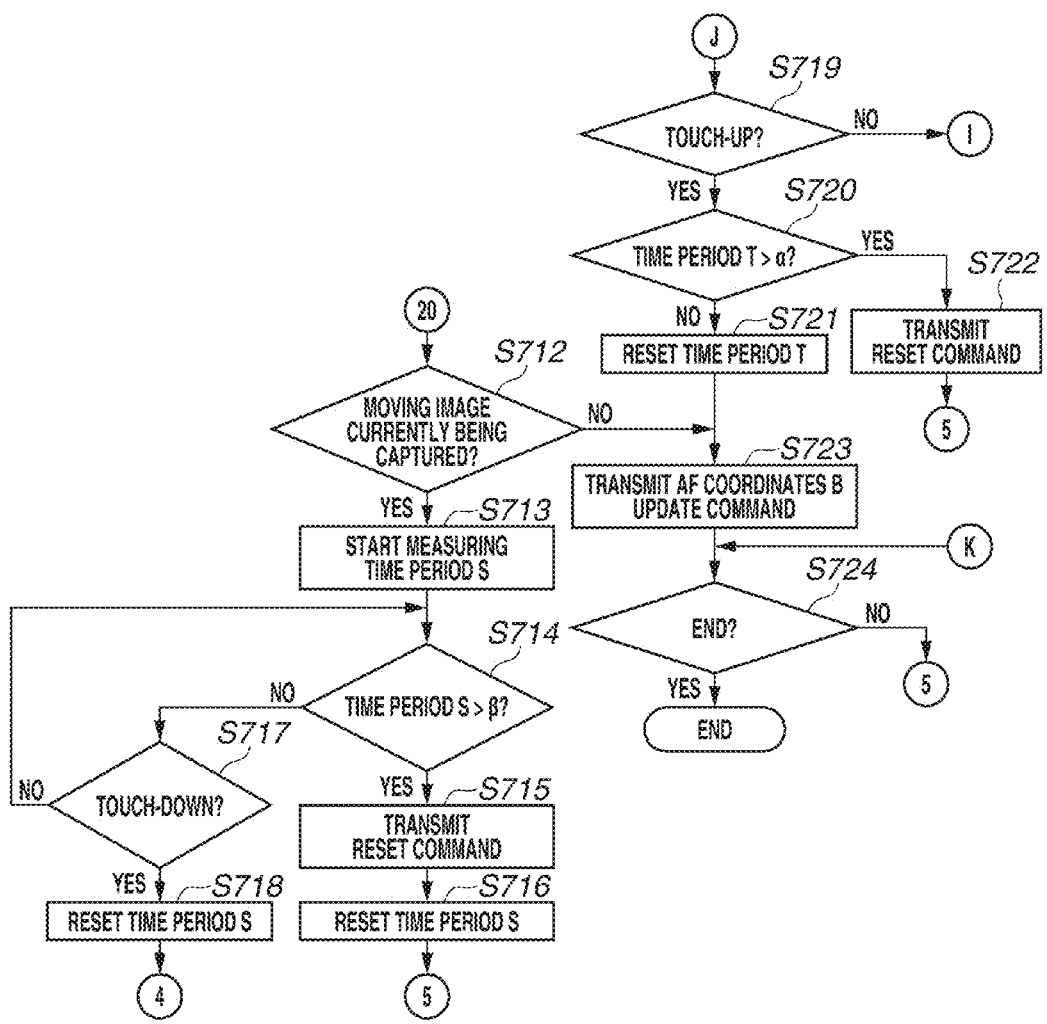
Figure 8A:
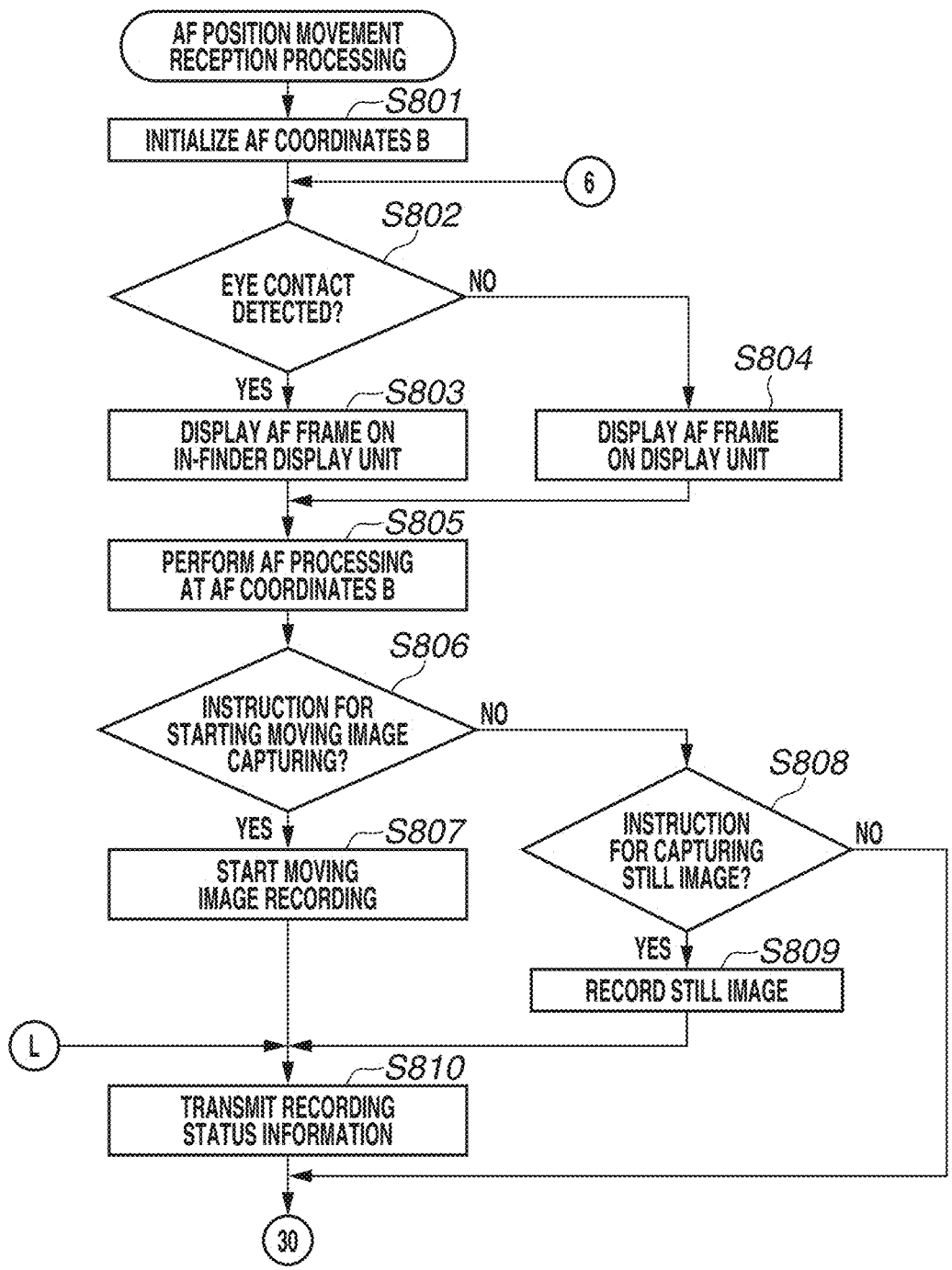

The AF position moving processing according to the modification of the second exemplary embodiment will be described below with reference to FIGS. 7A, 7B, 8A, and 8B. The processing illustrated in FIGS. 7A and 7B is implemented when a program recorded in the nonvolatile memory 511 is loaded into the system memory 510 and then executed by the system control unit 509. FIGS. 7A and 7B illustrate the processing of the remote controller 504. FIG. 8 illustrates the processing of the digital camera 300.

The AF position moving instruction processing illustrated in FIGS. 7A and 7B performed by the remote controller 504 will be described below. This processing is started when power of the digital camera 300 and the remote controller 504 is turned ON, the image capturing mode is selected, and communication between the remote controller 504 and the digital camera 300 is established. More specifically, the processing is started when the touch panel 508a of the remote controller 504 becomes ready to receive a touch operation and the digital camera 300 becomes ready to receive an instruction from the remote controller 504 and to perform the AF processing in response to an instruction from the remote controller 504.

In step S701, the system control unit 509 determines whether a touch-down on the touch panel 508a has been performed. When the system control unit 50 determines that a touch-down has been performed (YES in step S701), the processing proceeds to step S702. On the other hand, when the system control unit determines that a touch-down has not been performed (NO in step S701), the processing proceeds to step S724.

The processing in steps S702 to S705 is similar to the processing in steps S312 to S315 illustrated in FIG. 3B.

In step S706, the system control unit 509 transmits an AF frame changing command to the digital camera 300 via the communication unit 503.

The processing in steps S707 and S708 is similar to the processing in steps S317 and S318 illustrated in FIG. 3B.

In step S709, the system control unit 509 transmits the relative coordinates C calculated in step S708 to the digital camera 300 via the communication unit 503.

In step S710, the system control unit 509 determines whether a touch-up from the touch panel 508a has been performed. When the system control unit 50 determines that a touch-up has been performed (YES in step S710), the processing proceeds to step S711. When the system control unit 50 determines that a touch-up has not been performed (NO in step S710), the processing returns to step S707.

In step S711, the system control unit 509 acquires information about the recording status of the digital camera 300. The recording status is any one of "moving image recording", "waiting for moving image recording", and "still image capturing."

In step S712, the system control unit 509 determines whether the recording status of the digital camera 300 is "moving image recording" based on the information about the recording status acquired in step S711. When the system control unit 509 determines that the recording status is "moving image recording" (YES in step S712), the processing proceeds to step S713. When the system control unit 509 determines that the recording status is not "moving image recording" ("waiting for moving image recording" or "still image capturing") (NO in step S712), the processing proceeds to step S723.

The processing in steps S713 and S714 is similar to the processing in steps S322 and S323 illustrated in FIG. 3B.

In step S715, the system control unit 509 transmits a reset command to the digital camera 300 via the communication unit 503. The reset command is a command for making an operation relating to the relative coordinates C transmitted in step S709 not to have been performed.

The processing in steps S716 to S718 is similar to the processing in steps S325 to S327 illustrated in FIG. 3B.

The processing in steps S719 to S721 is similar to the processing in steps S328 to S330 illustrated in FIG. 3C.

In step S722, the system control unit 509 transmits a reset command to the digital camera 300 via the communication unit 503, similar in step S715.

In step S723, the system control unit 509 transmits an AF coordinates B update command (specific command) to the digital camera 300 via the communication unit 503. More specifically, the system control unit 509 instructs the digital camera 300 to update the AF coordinates B from the coordinates in step S701 to the coordinates calculated according to the relative coordinates C transmitted in step S709. In other words, the system control unit 509 transmits a command indicating an instruction for changing the AF coordinates issued by a user operation.

The processing in step S724 is similar to the processing in step S339 illustrated in FIG. 3C.

The AF position moving instruction processing illustrated in FIGS. 8A and 8B performed by the digital camera 300 will be described below. This processing is started when power of the digital camera 300 and the remote controller 504 is turned ON, the image capturing mode is selected, and communication between the remote controller 504 and the digital camera 300 is established. More specifically, the processing is started when the touch panel 508a of the remote controller 504 becomes ready to receive a touch operation and the digital camera 300 becomes ready to receive an instruction from the remote controller 504 and perform the AF processing in response to an instruction from the remote controller 504. This processing is implemented when a program recorded in the nonvolatile memory 56 is loaded into the system memory 52 and then executed by the system control unit 50.

The processing in steps S801 to S804 is similar to the processing in steps S300 to S303 illustrated in FIG. 3A.

The processing in steps S805 to S807 is similar to the processing in steps S304 to S306 illustrated in FIG. 3A.

The processing in steps S808 and S809 is similar to the processing in steps S308 and S309 illustrated in FIG. 3A.

In step S810, the system control unit 50 transmits information about the recording status to the remote controller 504 via the communication unit 503.

In step S811, the system control unit 50 determines whether an AF frame changing command has been transmitted. When the system control unit 50 determines that the AF frame changing command has been transmitted (YES in step S811), the processing proceeds to step S812. On the other hand, when the system control unit determines that the AF frame changing command has not been transmitted (NO in step S811), the processing proceeds to step S813.

In step S812, similar in step S316 illustrated in FIG. 3B, the system control unit 50 changes the AF frame 401 currently displayed at the AF coordinates B to the changing AF frame 402 indicating that the AF position is currently being changed.

In step S813, the system control unit 50 determines whether information about the relative coordinates C has been received. When the system control unit 50 determines that information about the relative coordinates C has been received (YES in step S813), the processing proceeds to step S814. On the other hand, when the system control unit determines that information about the relative coordinates C has not been received (NO in step S813), the processing proceeds to step S815.

In step S814, similar in step S319 illustrated in FIG. 3B, the system control unit 50 calculates the temporary AF coordinates P based on the AF coordinates B and the relative coordinates C calculated in step S318 and displays the temporary AF frame 403 at the temporary AF coordinates P. The temporary AF coordinates P is obtained by adding the AF coordinates B and the relative coordinates C, i.e., ((Xb+Xc),(Yb+Yc)).

In step S815, the system control unit 50 determines whether a reset command has been received. When the system control unit 50 determines that the reset command has been received (YES in step S815), the processing proceeds to step S816. On the other hand, when the system control unit determines that the reset command has not been received (NO in step S815), the processing proceeds to step S817.

In step S816, similar in step S324 or S331 illustrated in FIG. 3B, the system control unit 50 changes the changing AF frame 402 having been displayed at the AF coordinates B illustrated in FIG. 4B to the AF frame 401 and displays the AF frame 401 at the AF coordinates B as illustrated in FIG. 4A. Then, the system control unit 50 hides the temporary AF frame 403.

In step S817, the system control unit 50 determines whether an AF coordinates B update command has been received. When the system control unit 50 determines that the AF coordinates B update command has been received (YES in step S817), the processing proceeds to step S818. On the other hand, when the system control unit determines that the AF coordinates B update command has not been received (NO in step S817), the processing proceeds to step S821.

The processing in steps S818 to S820 is similar to the processing in steps S334 to S336 illustrated in FIG. 3C.

The processing in steps S821 to S823 is similar to the processing in steps S337 to S339 illustrated in FIG. 3C.

According to the above-described exemplary embodiments, the AF position can be changed with favorable operability during moving image recording and at other timings. When a moving image is currently being recorded (YES in step S712), the system control unit 50 does not perform the AF processing immediately after reception of the instruction for moving the AF position but performs the AF processing at the position changed in response to the determination operation. At timings other than moving image recording (before and after still image capturing, during waiting for moving image recording (NO in step S712)), the system control unit 50 performs the AF position moving operation. Then, upon reception of an end instruction (YES in step S817), the system control unit 50 performs the AF processing at the changed position (steps S818 to S820).

This processing eliminates the need of transmitting and receiving captured images and therefore processes a smaller amount of communication data than in processing for successively transmitting captured images to the display unit 505 of the remote controller 504 and specifying the AF position with the absolute coordinates through a touch operation on the subject in each displayed captured image. Therefore, timing delay due to a data communication delay hardly occur. Reception of instructions on the remote controller 504 enables the user to issue an instruction for moving the AF position at a suitable timing while observing the state of the subject displayed on the display unit 501 at a separate position.

The display formats of the AF frame 401, the changing AF frame 402, and the temporary AF frame 403 are not limited to those described in the present exemplary embodiment and need only to be distinguishably displayed. More specifically, the frame color may be changed, the frame may blink, the frame line thickness may be changed, the frame may be filled with a color, and a position may be indicated with a dot or arrow instead of a frame.

Although, in the above-described exemplary embodiments, an AF position moving operation is performed with a touch-move and a determination operation is performed with a tap, these operations are not limited thereto, and may be other touch operations or operations on buttons included in the operation unit 70. More specifically, the AF position moving operation may be a press of the cross key 74, an operation for rotating the main electronic dial 71, or the sub electronic dial 73. The determination operation may be a press of the SET button 75, a double-tap on the touch panel 70a, or a multi-touch thereon.

Although the above-described exemplary embodiments have specifically been described focusing on an operation for moving the position subjected to the AF processing, the exemplary embodiments are not limited thereto, and are applicable to setting (selection) of a position (region) where various processing is performed. For example, the above-described exemplary embodiments are applicable to selection of a face AF frame for focusing on a specific person's face and selection of a position subjected to enlargement and reduction (i.e., zoom-in and zoom out). The above-described exemplary embodiments are also applicable to selection of a subject, a position, or a region to be used as a reference when performing such processing as AE and WB.

The above-described exemplary embodiments have specifically been described as that, in a case of an absolute coordinate setting, the AF coordinates B is set to the touch-down coordinates O and then the AF processing is performed. However, the following processing is also applicable. Specifically, the system control unit 50 may perform the AF processing at the touch-down coordinates O in response to a touch-down at timings other than moving image capturing with an absolute coordinate setting, and may perform the AF processing at the touch-up coordinates (touch coordinates immediately before a touch-up) in response to a touch-up during moving image capturing.

When the user performs an operation with an absolute coordinate setting while looking into the finder (without displaying an image on the display unit 28), the system control unit 50 may set the AF coordinates B through a touch-up. When the user performs an operation with an absolute coordinate setting while observing the touch panel 70a (display unit 28), the system control unit 50 may set the AF coordinates B at the touch-down position. Further, the system control unit 50 may determine whether to set the AF coordinates B through a touch-down or a touch-up depending on the above-described display condition of the display unit 28 during moving image capturing, and may set the AF coordinates B through a touch-down regardless of the display condition at other timings.

Each of the above-described flowcharts to be executed by the system control units 50 and 509 may be controlled by one piece of hardware, and a plurality of pieces of hardware shares processing to control the entire apparatus.

Although the above-described exemplary embodiments describe digital cameras 100 and 300 and remote controller 504, these exemplary embodiments are also applicable to imaging control apparatuses that perform control to change the position subjected to processing based on a specified position, such as the AF processing, the AE processing, and the AWB processing. For example, a personal computer (PC), a mobile phone terminal, a portable image viewer, a digital photo frame, a music player, a game machine, an electronic book reader, a tablet PC, a smart phone, household appliances, etc. The exemplary embodiments are also applicable to a smart phone, a tablet PC, a desktop PC, and the like, which receive and display AF information of a digital camera, and the like via wired or wireless communication and remotely controls the digital camera (including a network camera).

Other Exemplary Embodiments

Exemplary embodiments are also implemented by performing the following processing. Specifically, software (program) for implementing the functions of the above-described exemplary embodiments is supplied to a system or apparatus via a network or various types of storage media, and a computer (or CPU or micro processing unit (MPU)) of the system or apparatus reads and executes the program. In this case, the program and the storage medium storing the program are included in the exemplary embodiments.

According to the present disclosure, during moving image recording and at timings other than moving image recording, it is possible to improve the operability of setting a specified position relating to specific processing to be performed based on the specified position.

According to the above exemplary embodiments, the following configurations are disclosed.

Embodiment 1

An imaging control apparatus includes a touch detection unit configured to detect a touch operation on a touch panel, a display control unit configured to control, in response to the touch detection unit detecting a moving operation of moving a touch position, a first mark to be displayed at a position on a display unit moved by an amount corresponding to the moving operation, and a control unit configured to perform control, during recording of a captured moving image, not to perform specific processing relating to image capturing even if the touch detection unit detects a touch-up operation which is releasing of the touch performed following the moving operation, and perform control, in a predetermined state other than during recording of a captured moving image, to perform the specific processing based on a position where the touch-up operation is detected, in response to the touch detection unit detecting a touch-up operation performed following the moving operation.

Embodiment 2

An imaging control apparatus includes a touch detection unit configured to detect a touch operation on a touch panel, a display control unit configured to control, in response to the touch detection unit detecting a moving operation of moving a touch position, a first mark to be displayed at a position on a display unit moved by an amount corresponding to the moving operation, and a control unit configured to perform control, during recording of a captured moving image, not to perform specific processing relating to image capturing during at least a predetermined time period even if the touch detection unit detects a touch-up operation which is releasing of the touch performed following the moving operation, and perform control, in a predetermined state other than during recording of a captured moving image, to perform within the predetermined time period the specific processing based on a position where the touch-up operation is detected, in response to the touch detection unit detecting a touch-up operation performed following the moving operation.

Embodiment 3

An imaging control apparatus includes a receiving unit configured to receive a command relating to a touch operation received by an external apparatus capable of receiving a touch operation, a display control unit configured to control, in response to a reception of a command relating to a moving operation of moving a touch position from the external apparatus, a first mark to be displayed at a position, on a display unit, moved by an amount corresponding to the moving operation, and a control unit configured to perform control, during recording of a captured moving image, not to perform specific processing relating to image capturing even a command relating to a touch-up operation is received which is releasing of the touch performed following the moving operation, and perform control, in a predetermined state other than during recording of a captured moving image, to perform the specific processing based on a position where the touch-up operation is detected, in response to a reception of the command relating to a touch-up operation from the external apparatus.

Embodiment 4

An imaging control apparatus includes a touch detection unit configured to detect a touch operation, a transmission unit configured to transmit a command to an imaging apparatus capable of executing specific processing relating to image capturing, and a transmission control unit configured to, in response to the touch detection unit detecting a moving operation of moving a touch position, control the transmission unit to transmit a command relating to a moving amount of the moving operation to the imaging apparatus, and configured to, in response to the touch detection unit detecting a touch-up operation which is releasing of the touch performed following the moving operation, control the transmission unit not to transmit a specific command for performing specific processing relating to image capturing during recording of a captured moving image in the imaging apparatus and to transmit the specific command in a predetermined state other than during recording of a captured moving image in the imaging apparatus.

Other Embodiments

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-234301, filed Nov. 30, 2015, which is hereby incorporated by reference herein in its entirety.

What is claimed is:

1. An imaging control apparatus comprising:
   a touch detection unit configured to detect a touch operation on a touch panel;
   a display control unit configured to control, in response to the touch detection unit detecting a moving operation of moving a touch position of the detected touch operation, a first mark to be displayed at a position on a display unit moved by an amount corresponding to the moving operation; and
   a control unit configured to perform control, during recording of a captured moving image, not to perform specific processing relating to image capturing during at least a predetermined time period even if the touch detection unit detects a touch-up operation, which is releasing the touch performed following the moving operation, and to perform control, in a predetermined state other than during recording of a captured moving image, to perform within the predetermined time period the specific processing based on a position where the touch-up operation is detected in response to the touch detection unit detecting a touch-up operation performed following the moving operation.

2. The imaging control apparatus according to claim 1, wherein the specific processing is an automatic focus, an automatic exposure setting, or an automatic white balance.

3. The imaging control apparatus according to claim 1, wherein, during recording of a captured moving image, the control unit performs control to perform the specific processing based on a position where the touch-up operation is detected in response to a detection of a specific operation within a predetermined time period after the detection of the touch-up operation.

4. The imaging control apparatus according to claim 3, wherein the specific operation is a tap operation on the touch panel.

5. The imaging control apparatus according to claim 1, wherein, during recording of a captured moving image, the display control unit performs control to hide the first mark in response to, after the touch detection unit detects a touch-up operation performed following the moving operation, cancellation processing for not performing the specific processing according to the moving operation.

6. The imaging control apparatus according to claim 5, wherein, during recording of a captured moving image, the cancellation processing is performed in response to, after the touch detection unit detects a touch-up operation performed following the moving operation, an elapse of a predetermined time period without a detection of the specific operation.

7. The imaging control apparatus according to claim 5, wherein, during recording of a captured moving image, the cancellation processing is performed in response to, after the touch detection unit detects a touch-up operation performed following the moving operation, a detection of a second operation different from the specific operation performed within a predetermined time period.

8. The imaging control apparatus according to claim 1, wherein, during recording of a captured moving image, the control unit performs control not to perform specific processing relating to image capturing even if the touch detection unit detects a touch-up operation performed following the moving operation.

9. The imaging control apparatus according to claim 1, wherein, in the predetermined state other than during recording of a captured moving image, the display control unit performs control to change a display format of the first mark in response to a detection of the touch detection unit detecting a touch-up operation performed following the moving operation.

10. The imaging control apparatus according to claim 1, wherein, in the predetermined state other than during recording of a captured moving image, the display control unit performs control to hide the first mark in response to the touch detection unit detecting a touch-up operation performed following the moving operation.

11. The imaging control apparatus according to claim 1,
    wherein, before the touch detection unit detects a moving operation of moving a touch position, the display control unit performs control to display a second mark at a position on the display unit as a reference for the specific processing, and
    wherein, in response to the touch detection unit detecting a moving operation of moving a touch position, the display control unit performs control to display a third mark, as a different display format from the second mark, at a position on the display unit as a reference for the specific processing.

12. The imaging control apparatus according to claim 1, wherein, during recording of a captured moving image, after the touch detection unit detects the touch-up operation performed following the moving operation, the display control unit performs control to hide the first mark and at a same time displays a second mark at a position on the display unit as a reference for the specific processing set before the moving operation.

13. The imaging control apparatus according to claim 1, wherein, in a predetermined state other than during recording of a captured moving image, in response to the touch detection unit detecting a touch-up operation performed following the moving operation, the display control unit performs control to display a second mark at a position on the display unit based on a position where the touch-up operation is detected.

14. The imaging control apparatus according to claim 1, wherein, during recording of a captured moving image, in response to a detection of the touch-up operation, the display control unit performs control to display a guide indicating that the specific processing is not to be performed depending on the touch-up operation.

15. The imaging control apparatus according to claim 1, further comprising an approach detection unit configured to detect that an object has approached a finder enabling visual recognition through an eyepiece portion,
wherein the display unit is provided in the finder, and
wherein, in response to the approach detection unit detecting an object approaching, the display control unit performs control to perform display on the display unit.

16. The imaging control apparatus according to claim 15, wherein the display control unit further controls display on the touch panel,
wherein, in a case where the approach detection unit detects an object approaching, in response to the touch detection unit detecting a moving operation of moving a touch position, the display control unit displays a first mark at a position, on a display unit, moved by an amount corresponding to the moving operation, and
wherein, in a case where an object is not approaching the finder, in response to the touch detection unit detecting a touch operation, the display control unit performs control to display a mark at a touch position on the touch panel.

17. The imaging control apparatus according to claim 1, wherein, during recording of a captured moving image, in response to an elapse of a predetermined time period since detection of the touch-up operation, the control unit performs control to perform the specific processing based on a position where the touch-up operation is detected.

18. The imaging control apparatus according to claim 1, further comprising a transmission unit configured to transmit a command to an imaging apparatus that executes specific processing relating to image capturing,
wherein, in response to the touch detection unit detecting a moving operation of moving a touch position, the control unit transmits to the imaging apparatus a command relating to a moving amount of the moving operation,
wherein, in response to the touch detection unit detecting a touch-up operation that is releasing the touch performed following the moving operation, during recording of a captured moving image in the imaging apparatus, the control unit does not transmit a specific command for performing the specific processing not to perform the specific processing, and
wherein, in a predetermined state other than during recording of a captured moving image in the imaging apparatus, the control unit transmits the specific command to perform the specific processing.

19. The imaging control apparatus according to claim 18, wherein, during recording of a captured moving image in the imaging apparatus, the control unit controls the transmission unit to transmit the specific command in response to the touch detection unit detecting a tap operation.

20. The imaging control apparatus according to claim 1, wherein, after performing the specific processing, the control unit controls a captured moving image to be recorded in a nonvolatile memory.

21. The imaging control apparatus according to claim 1, further comprising an instruction unit configured to give an instruction to start recording a moving image captured by an imaging unit.

22. The imaging control apparatus according to claim 1, further comprising a switching unit configured to, in response to a detection of a moving operation of moving a touch position on the touch panel, switch between a relative coordinate setting for displaying the first mark at a position, on a display unit, moved by an amount corresponding to the moving operation and an absolute coordinate setting for displaying the first mark at the touch position on the touch panel,
wherein, in a case where the absolute coordinate setting is selected, the control unit performs control to perform the specific processing based on a position where a touch-up operation, which is releasing of the touch, is detected.

23. The imaging control apparatus according to claim 1, wherein the predetermined state includes at least one of a state where a still image capturing mode is set, a state where a moving image is not being recorded in a moving image capturing mode, or a state where a live view is displayed but a moving image is not being recorded.

24. An imaging control apparatus comprising:
a receiving unit configured to receive a command relating to a touch operation received by an external apparatus that receives a touch operation;
a display control unit configured to control, in response to receipt of a command relating to a moving operation of moving a touch position of the touch operation from the external apparatus, a first mark to be displayed at a position, on a display unit, moved by an amount corresponding to the moving operation; and
a control unit configured to perform control, during recording of a captured moving image, not to perform specific processing relating to image capturing even if a command relating to a touch-up operation, which is releasing the touch performed following the moving operation, is received, and to perform control, in a predetermined state other than during recording of a captured moving image, to perform the specific processing based on a position where the touch-up operation is detected, in response to a reception of the command relating to a touch-up operation from the external apparatus.

25. A method for controlling an imaging control apparatus, comprising:
detecting a touch operation on a touch panel;
performing control, in response to detecting a moving operation of moving a touch position of the detected touch operation, to display a first mark at a position, on a display unit, moved by an amount corresponding to the moving operation; and
performing control, during recording of a captured moving image, not to perform specific processing relating to image capturing during at least a predetermined time period even if a touch-up operation, which is releasing the touch performed following the moving operation, is detected, and performing control, in a predetermined state other than during recording of a captured moving image, to perform within the predetermined time period the specific processing based on a position where the touch-up operation is detected in response to a detection of a touch-up operation performed following the moving operation.

26. A method for controlling an imaging control apparatus, comprising:

receiving a command relating to a touch operation received by an external apparatus that receives a touch operation;

performing control, in response to receipt of a command relating to a moving operation of moving a touch position of the touch operation from the external apparatus, to display a first mark at a position, on a display unit, moved by an amount corresponding to the moving operation; and performing control, during recording of a captured moving image, not to perform specific processing relating to image capturing even if a command relating to a touch-up operation, which is releasing the touch performed following the moving operation, is received, and performing control, in a predetermined state other than during recording of a captured moving image, to perform the specific processing based on a position where the touch-up operation is detected in response to a reception of the command relating to a touch-up operation from the external apparatus.

27. A non-transitory computer-readable storage medium storing computer executable instructions for executing a method, the method comprising:

detecting a touch operation on a touch panel;

performing control, in response to detecting a moving operation of moving a touch position of the detected touch operation, to display a first mark at a position, on a display unit, moved by an amount corresponding to the moving operation; and performing control, during recording of a captured moving image, not to perform specific processing relating to image capturing during at least a predetermined time period even if a touch-up operation, which is releasing the touch performed following the moving operation, is detected, and performing control, in a predetermined state other than during recording of a captured moving image, to perform within the predetermined time period the specific processing based on a position where the touch-up operation is detected in response to a detection of a touch-up operation performed following the moving operation.

28. A non-transitory computer-readable storage medium storing computer executable instructions for executing a method, the method comprising:

receiving a command relating to a touch operation received by an external apparatus that receives a touch operation;

performing control, in response to receipt of a command relating to a moving operation of moving a touch position of the touch operation from the external apparatus, to display a first mark at a position, on a display unit, moved by an amount corresponding to the moving operation; and performing control, during recording of a captured moving image, not to perform specific processing relating to image capturing even if a command relating to a touch-up operation, which is releasing the touch performed following the moving operation, is received, and performing control, in a predetermined state other than during recording of a captured moving image, to perform the specific processing based on a position where the touch-up operation is detected in response to a reception of the command relating to a touch-up operation from the external apparatus.

* * * * *